(12) United States Patent
Dunfee et al.

(10) Patent No.: US 11,519,771 B2
(45) Date of Patent: Dec. 6, 2022

(54) SHORT ASPIRATION DETECTION IN A CLINICAL ANALYZER

(71) Applicant: Siemens Healthcare Diagnostics Inc., Tarrytown, NY (US)

(72) Inventors: William D. Dunfee, Newark, DE (US); Stephen Krufka, Newark, DE (US); Mark H. Sprenkle, Newark, DE (US); Colin Ingersoll, Wilmington, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 953 days.

(21) Appl. No.: 16/319,261

(22) PCT Filed: Jul. 19, 2017

(86) PCT No.: PCT/US2017/042923
§ 371 (c)(1),
(2) Date: Jan. 18, 2019

(87) PCT Pub. No.: WO2018/017756
PCT Pub. Date: Jan. 25, 2018

(65) Prior Publication Data
US 2019/0234787 A1      Aug. 1, 2019

Related U.S. Application Data

(60) Provisional application No. 62/365,261, filed on Jul. 21, 2016.

(51) Int. Cl.
*G01F 22/02*      (2006.01)
*G01N 35/10*      (2006.01)
*G01F 25/00*      (2022.01)

(52) U.S. Cl.
CPC ......... *G01F 22/02* (2013.01); *G01N 35/1016* (2013.01); *G01F 25/0084* (2013.01); *G01N 2035/1018* (2013.01)

(58) Field of Classification Search
None
See application file for complete search history.

(56) References Cited

U.S. PATENT DOCUMENTS 5,723,795 A * 3/1998 Merriam ............... G01F 11/029
137/557
5,915,282 A * 6/1999 Merriam ............ G01N 35/1016
73/864.11

(Continued)

FOREIGN PATENT DOCUMENTS

JP      H11-501399 A      2/1999
WO      98/53325 A1      11/1998

OTHER PUBLICATIONS

PCT International Search Report and Written Opinion dated Oct. 3, 2017 (7 Pages).

(Continued)

*Primary Examiner* — Brian R Gordon

(57) ABSTRACT

One embodiment provides a method for detecting aspiration in a clinical analyzer, including: acquiring, from a sensor, pressure measurement data; transforming the pressure measurement data into frequency domain data; generating a clean version of the frequency domain data by attenuating, using a filter, unwanted frequencies; comparing the cleaned version of the frequency domain data to one or more predetermined data points; and determining, based on the comparison, if an aspiration was properly performed. Other aspects are described and claimed herein.

19 Claims, 28 Drawing Sheets

(56) References Cited

U.S. PATENT DOCUMENTS

| | | | |
|---|---|---|---|
| 5,965,828 A * | 10/1999 | Merriam | G01F 11/00 |
| | | | 137/557 |
| 6,370,942 B1 | 4/2002 | Dunfee et al. | |
| 7,634,378 B2 | 12/2009 | Kaplit et al. | |
| 8,026,101 B2 * | 9/2011 | Bower | G01N 35/00603 |
| | | | 436/180 |
| 2005/0119600 A1 * | 6/2005 | Lucke | A61M 1/3666 |
| | | | 604/6.15 |
| 2007/0048868 A1 | 3/2007 | Shibata et al. | |
| 2011/0174343 A1 | 7/2011 | Azuma et al. | |
| 2013/0143257 A1 | 6/2013 | Small et al. | |
| 2015/0276534 A1 | 10/2015 | Dunfee et al. | |
| 2016/0157704 A1 | 6/2016 | Hsieh et al. | |

OTHER PUBLICATIONS

Extended EP Search Report dated Jul. 4, 2019 of corresponding European Application No. 17831822.6, 4 Pages.
Nan, Mao: National Defense Industry Press; "Practical Technique for Anti-Interference of Electronic Circuits" Jan. 31, 1996; CN; pp. 1-8; ISBN 7-118-01472-9.

* cited by examiner

SHORT ASPIRATION DETECTION IN A CLINICAL ANALYZER

CROSS-REFERENCE TO RELATED APPLICATION

This application claims the benefit of U.S. Provisional Application Ser. No. 62/365,261 filed Jul. 21, 2016, which is incorporated herein by reference in its entirety.

TECHNOLOGY FIELD

The present invention relates generally to a system for detection of abnormal aspirations due to clots or short aspirations in a cynical analyzer.

BACKGROUND

Clinical testing is a very precise process. Thus, any disturbance in the results or testing process may greatly impact the results of the solutions being tested. Because of this inherent delicacy, monitoring of the testing process is vital to ensure the most accurate results. Additionally, because of the precise nature of clinical testing, the variances and tolerances are extremely low. These tight constraints can make it difficult to determine when an abnormality actually occurs.

For example, determining the quality of a metered sample or reagent transfer during the testing process is an important function of a clinical diagnostic instrument. Some of the typical failure modes that would be desirable to detect include: probe clogs, insufficient sample, and reagent present in the liquid vessel. Currently, a common method used for determining the quality of an aspiration test is monitoring the pressure in the aspiration system during an event (e.g., the system shown in FIG. 1 comprising a pump 101, tubing 102, a pressure transducer 103, a probe 104, and a liquid vessel 105). Using this method, it is possible to analyze any current pressure and make a determination of the quality of the aspiration/dispense. However, as aspiration volume decreases, and if a liquid (such as water) is used as a working fluid to couple the pump to the probe, the pressure signal becomes increasingly difficult to analyze due to the lower amplitude signal resulting from lower aspiration speeds and/or aspiration time. This is due to noise masking the information contained in the measurement.

Thus, there is a need for a more precise and accurate method of determining the pressure of the system.

SUMMARY

Embodiments are directed to systems and methods for short aspiration detection in a clinical analyzer.

Accordingly, an embodiment provides a method for detecting aspiration in a clinical analyzer, comprising: acquiring, from a sensor, pressure measurement data; transforming the pressure measurement data into frequency domain data; generating a clean version of the frequency domain data by attenuating, using a filter, unwanted frequencies; comparing the cleaned version of the frequency domain data to one or more predetermined data points; and determining, based on the comparison, if an aspiration was properly performed.

A further embodiment provides an information handling device for detecting aspiration in a clinical analyzer, comprising: a processor; a sensor; a memory device that stores instructions executable by the processor to: acquire, from the sensor, pressure measurement data; transform the pressure measurement data into frequency domain data; generate a clean version of the frequency domain data by attenuating, using a filter, unwanted frequencies; compare the cleaned version of the frequency domain data to one or more predetermined data points; and determine, based on the comparison, if an aspiration was properly performed.

Another embodiment provides a program product for detecting aspiration in a clinical analyzer, comprising: a storage device having code stored therewith, the code being executable by a processor and comprising: code that acquires, from a sensor, pressure measurement data; code that transforms the pressure measurement data into frequency domain data; code that generates a clean version of the frequency domain data by attenuating, using a filter, unwanted frequencies; code that compares the cleaned version of the frequency domain data to one or more predetermined data points; and code that determines, based on the comparison, if an aspiration was properly performed.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIGS. 29-31 are further examples of embodiments discussed herein.

DETAILED DESCRIPTION

Embodiments herein are directed to a monitoring system for detecting aspiration abnormalities. Although some solutions currently exist, they fall short in various areas. One particular area is when aspiration volume decreases and liquid is used as a working fluid. Advantageously, an embodiment's transformative automation system allows for precise monitoring and abnormality identification even during such an event. Moreover, the embodiment reduces the chances for errors in detection, such as false positives or missed abnormalities.

Generally, for larger volumes or significant aspiration abnormalities (e.g., a complete probe clog), current methods are sufficient for detection. Additionally, the functionality of the current methods seems viable in air-coupled systems, as the air provides damping to the pressure signal. However, as aspiration volume decreases, and if a liquid (e.g., water) is used as a working fluid to couple the pump to the probe, the pressure signal will likely become increasingly difficult to analyze. This is mainly due to the lower amplitude signal resulting from lower aspiration speeds and/or aspiration time. It can also be due to noise, inherent in the system, making the information contained in the measurement difficult to discern.

This noise may be a result of the dynamics of the metering system. A list of non-limiting examples may include noise from a pump attached to the system, resonant frequencies of the fluidics system, vibrations, etc. The noise may also originate at sources external to the system, such as, for example, vibration of other components within the analyzer or disturbances from the external environment.

Figure 1:
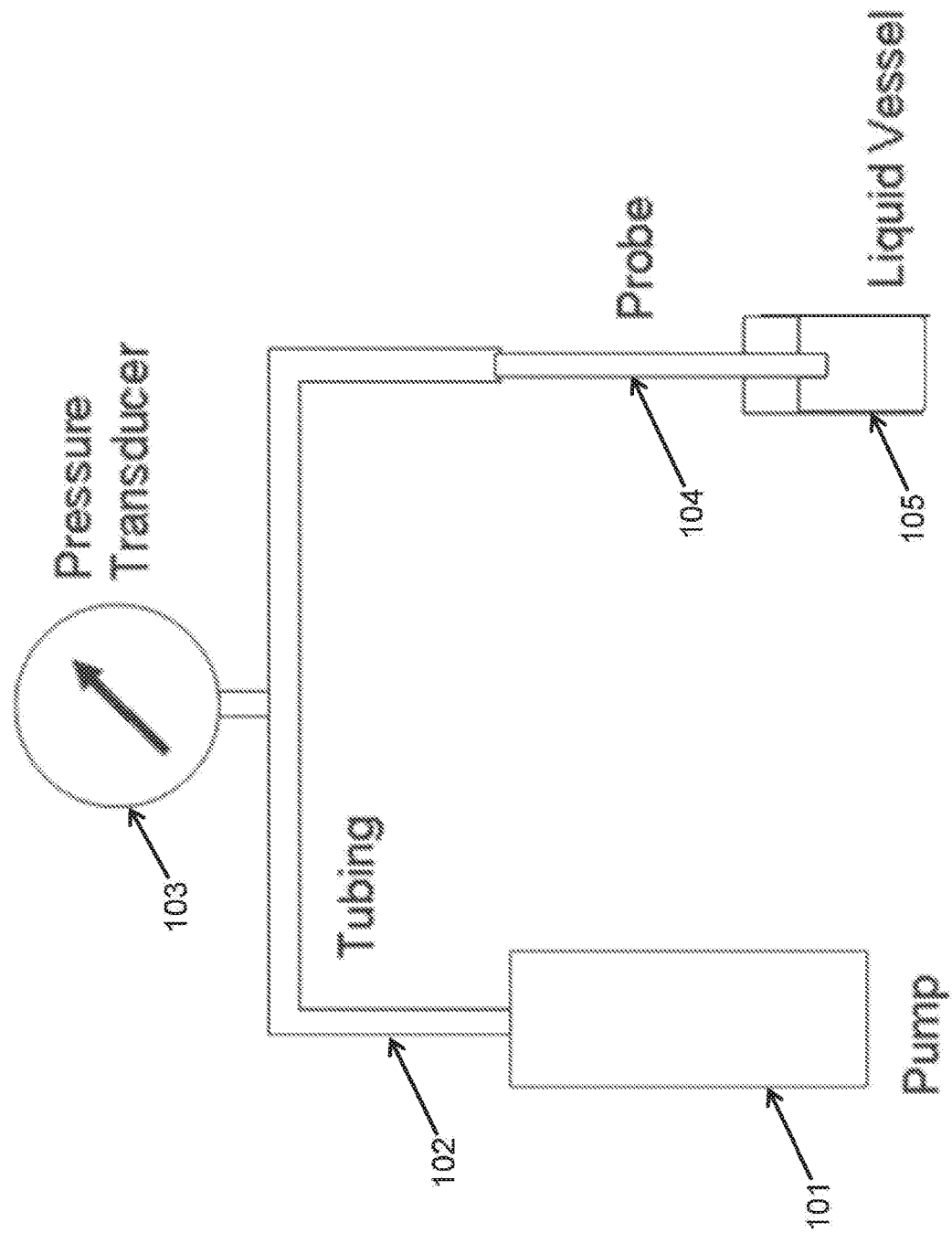
FIG. 1 is an example of a typical metering system with pressure monitoring.
Figure 2:
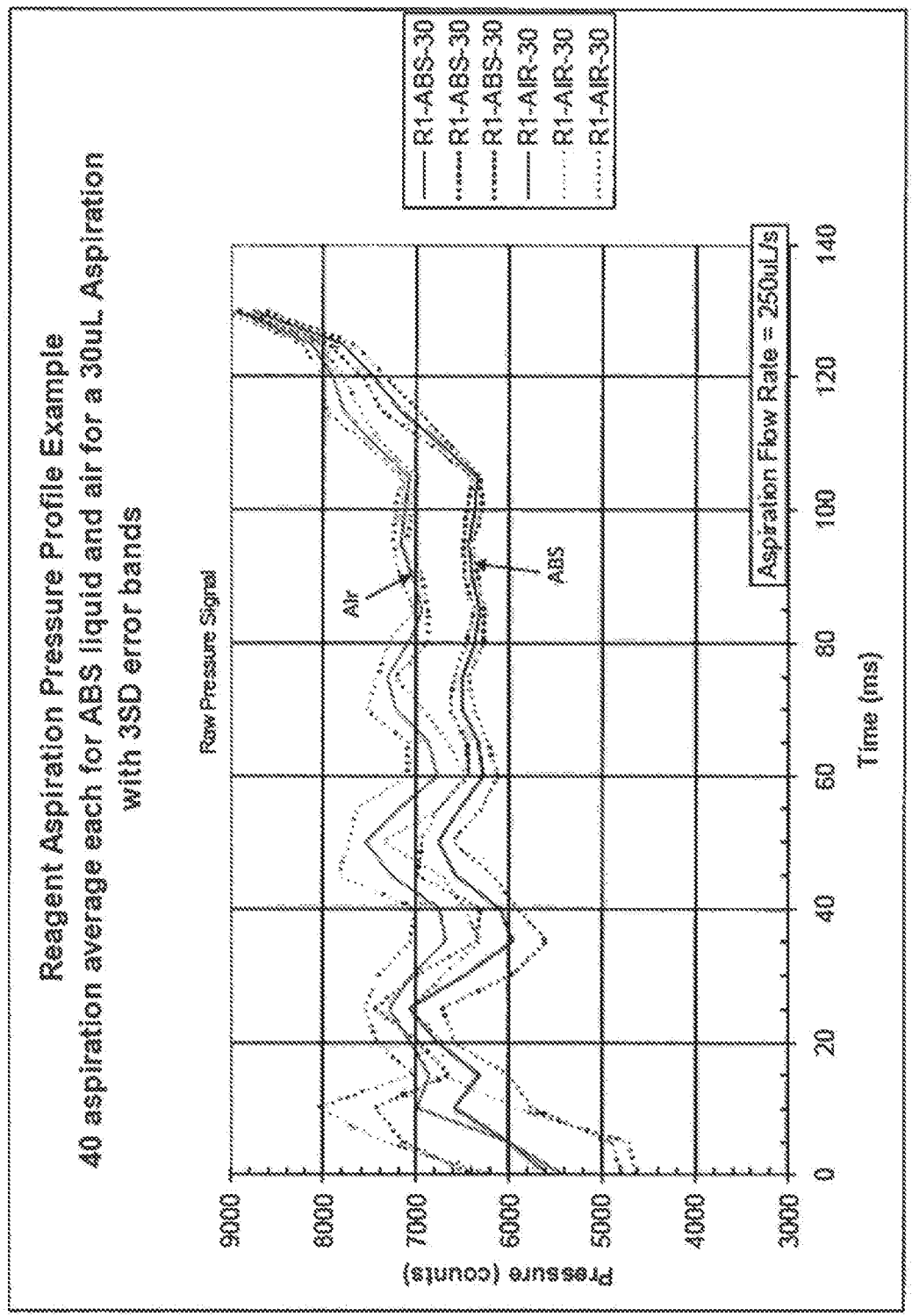
FIG. 2 is a graphical example of a pressure signal from a 30 µL liquid and air aspiration.
Figure 3:
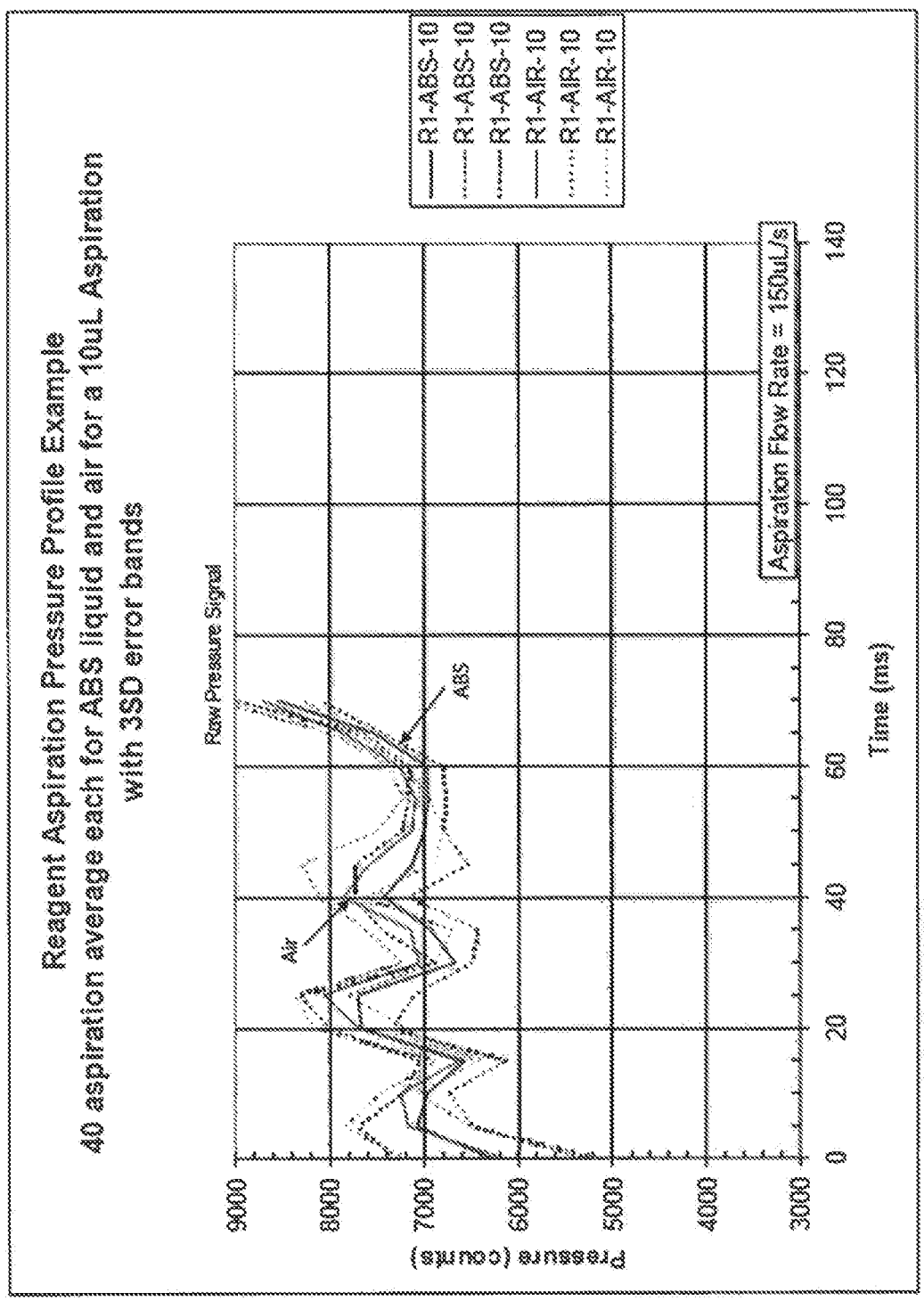
FIG. 3 is a graphical example of a pressure signal from a 10 µL liquid and air aspiration.

Referring now to FIG. 2, an example of large volume aspiration pressure curves detected when liquid and air are aspirated is shown. As shown in FIG. 2, the illustrative difference between the two curves (at a volume of 30 μL) is clearly defined, and quite distinct, as indicated by the statistical three standard deviation error bands. This clearly defined separation is especially true near the end of the aspiration (e.g., before the pump begins to decelerate at about 105 ms). Because the difference is so pronounced, an embodiment would be able to clearly determine if a probe was aspirated air or liquid. Moreover, an embodiment could also determine if the liquid aspiration was successful or blocked, because a blocked aspiration typically results in significantly lower pressures. Alternatively, if the aspiration volume is decreased to 10 μL, such as that shown in FIG. 3, the difference between aspirating air and liquid becomes nearly impossible to reliably distinguish.

Accordingly, an embodiment may address this issue by calculating an average or median of the pressure at one or more points. Although this may be somewhat effective in clarifying the signal, it does not allow for pressure signal differentiation at small volumes. Additionally, it may be susceptible to possible phase shifts of higher frequency noises. For example, if a determined reference and test pressure curve both contained an oscillation, and if the oscillation was in phase, then it may be possible for the curves to be distinguished. Alternatively, if the oscillation is not in phase with regard to the two curves, it is possible the curves overlap, thus preventing them from being distinguishable from one another. Because of these factors, robust aspiration quality measurements have been difficult, or near impossible, to achieve at lower volumes.

In order to overcome these obstacles, embodiments relate to an improved technique for generating and analyzing aspiration or dispense pressure signals. Generally, the relevant information contained in a pressure signal is considered low frequency in nature when it is on the order of 1 to 15 Hz. As should be understood by one skilled in the art, this pressure signal is essentially the change in pressure as the pump performs an aspiration. The response graph associated with the pressure signal is generally a "bathtub" shaped curve (i.e., it drops from a baseline level, e.g., in the case of an aspiration), remains at a lower level during the bulk of the aspiration, and then returns to secondary baseline level when aspiration is completed. Other effects that may mask information are usually of higher frequencies, generally 20-50 Hz or more.

Therefore, by processing the signal in the frequency domain rather than the time domain, this frequency-based information can be separated from the signal and cleaned of the potential noise. By way of specific example, the high frequency noise may be reduced or eliminated through the use of a low-pass filter transform. Thus, an embodiment may apply a low-pass filter to the raw pressure signal prior to full analysis. This gives an embodiment better access to the underlying information regarding the aspiration (i.e., the variation becomes more visible).

Additionally, because the filtering is done in the frequency domain rather than the time domain, the phase difference between compared signals becomes irrelevant. Thus, not only does an embodiment improve the accuracy of identifying an anomaly, but it also removes a prevalent issue with regard to the previous monitoring method.

In the following non-limiting examples, a 2nd order digital Butterworth low-pass filter (e.g., with a cutoff frequency of approximately 10 Hz) was applied. It should be noted, however, that the following simplified examples are given for explanatory purposes only. It would be obvious to one of ordinary skill in the art that other types of filters including: analog hardware filters and Finite Impulse Response (FIR) filters could be employed.

For the purposes of illustration, the transformed pressure curves shown herein have had a scalar offset of −7800 applied to the data prior to filtering. This was done to place the raw pressure curve on a "zero" basis and, thus, allow for easier visualization of the connection between the filtered data and the aspiration profile. However, this scaling (i.e., the −7800 offset) has no effect on the detected differences between filtered pressure curves and, thus, is not required for implementation of the aspiration quality assessment described herein.

Figure 4:
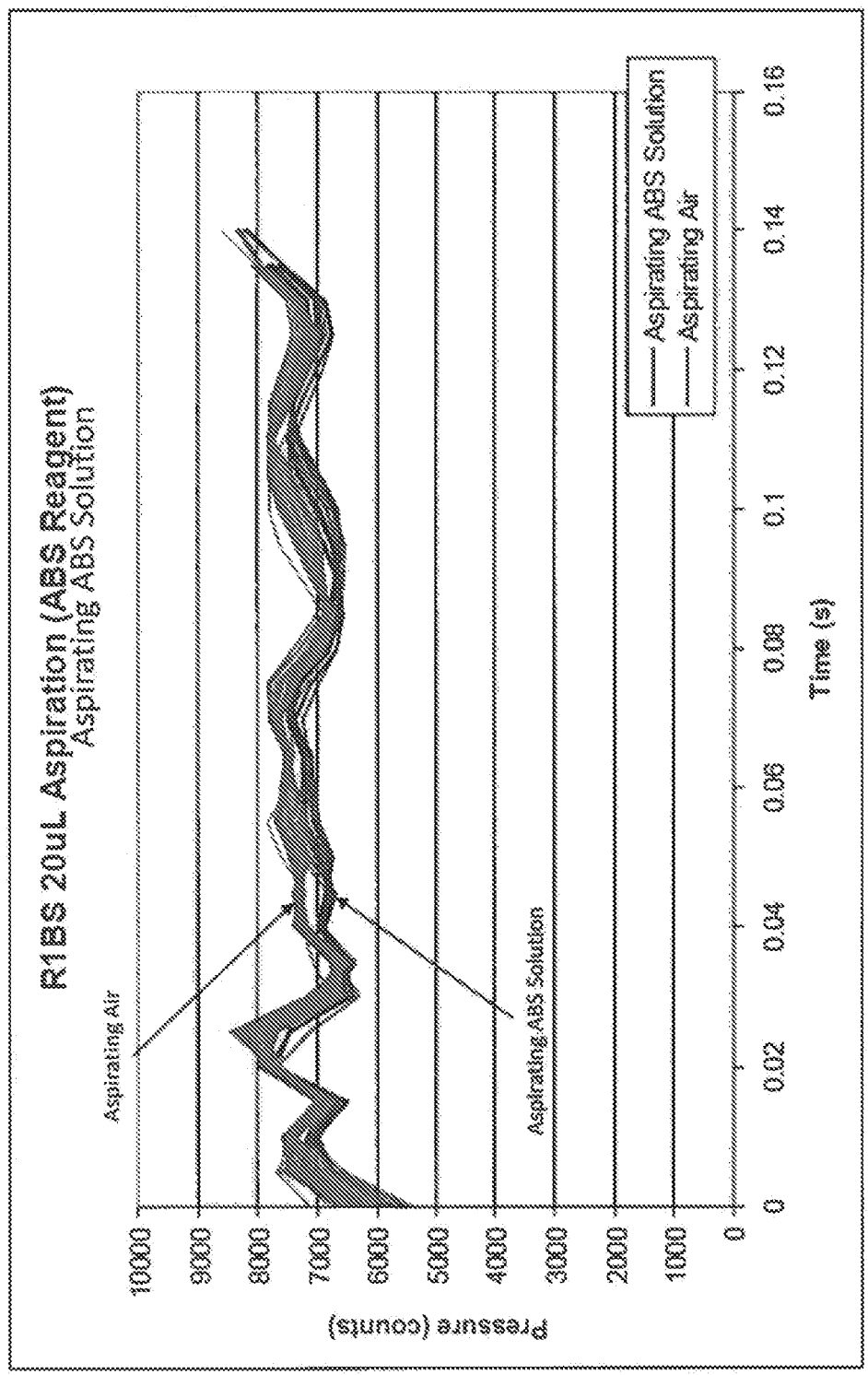
FIG. 4 is a graphical example of a pressure signal from a 20 µL liquid and air aspiration.
Figure 5:
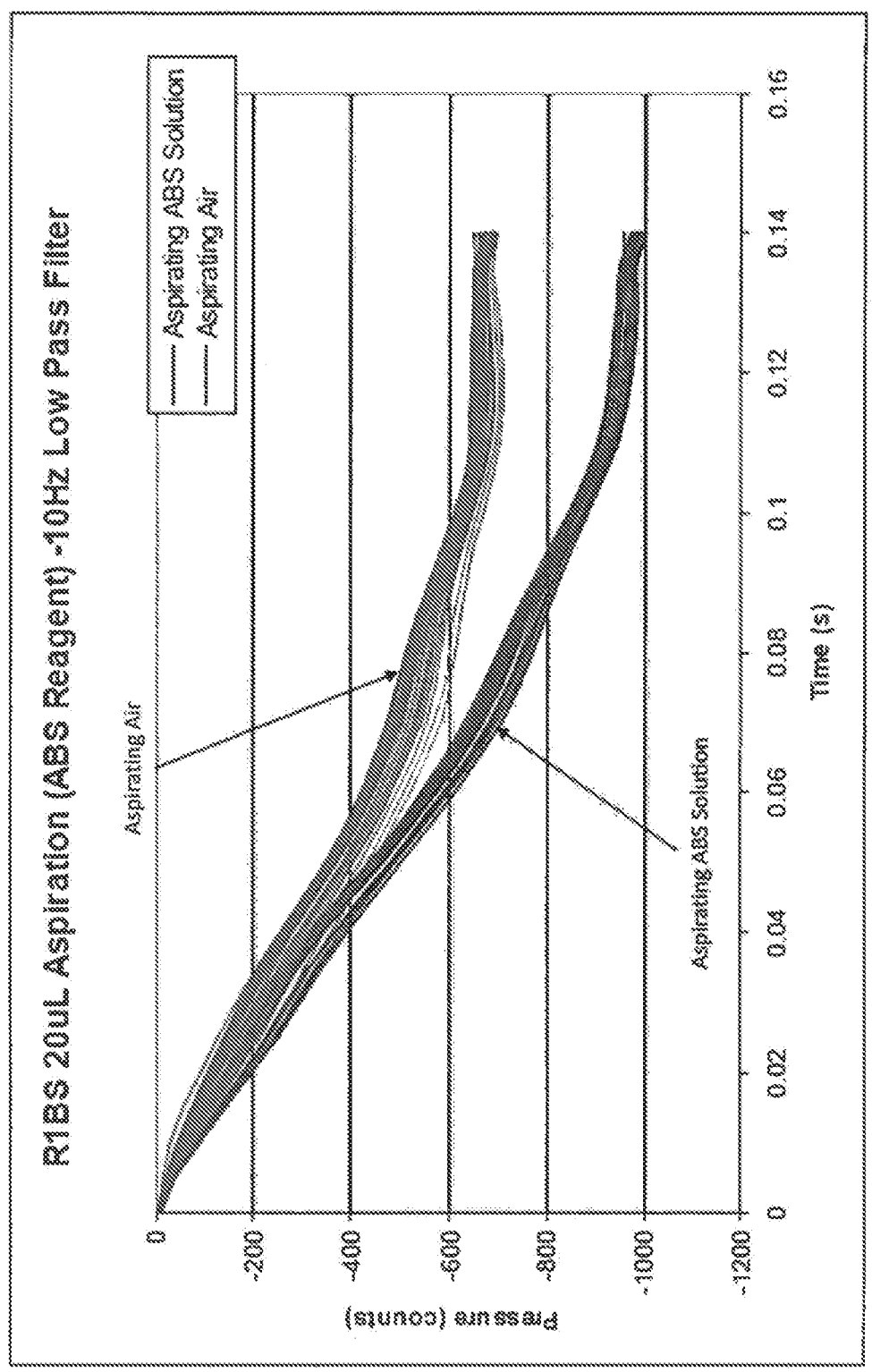
FIG. 5 is a graphical example of a filtered pressure signal from a 20 µL liquid and air aspiration.

An example of a 20 μL reagent aspiration at 150 μL/s, lasting only 140 ms, is shown in FIG. 4. The chart displays the pressure curves of 30 aspirations each of liquid and air. As made clear by FIG. 4, the two plotted sets of data overlap throughout the aspiration event. Alternatively, FIG. 5 is an example illustration of the same data contained in FIG. 4 (i.e., on the same relative scale). However, the data depicted in FIG. 5 has been transformed via a digital filter, as discussed herein. Thus, an embodiment is able to visualize a clear separation between the sets of liquid and air aspiration pressure curves.

Figure 6:
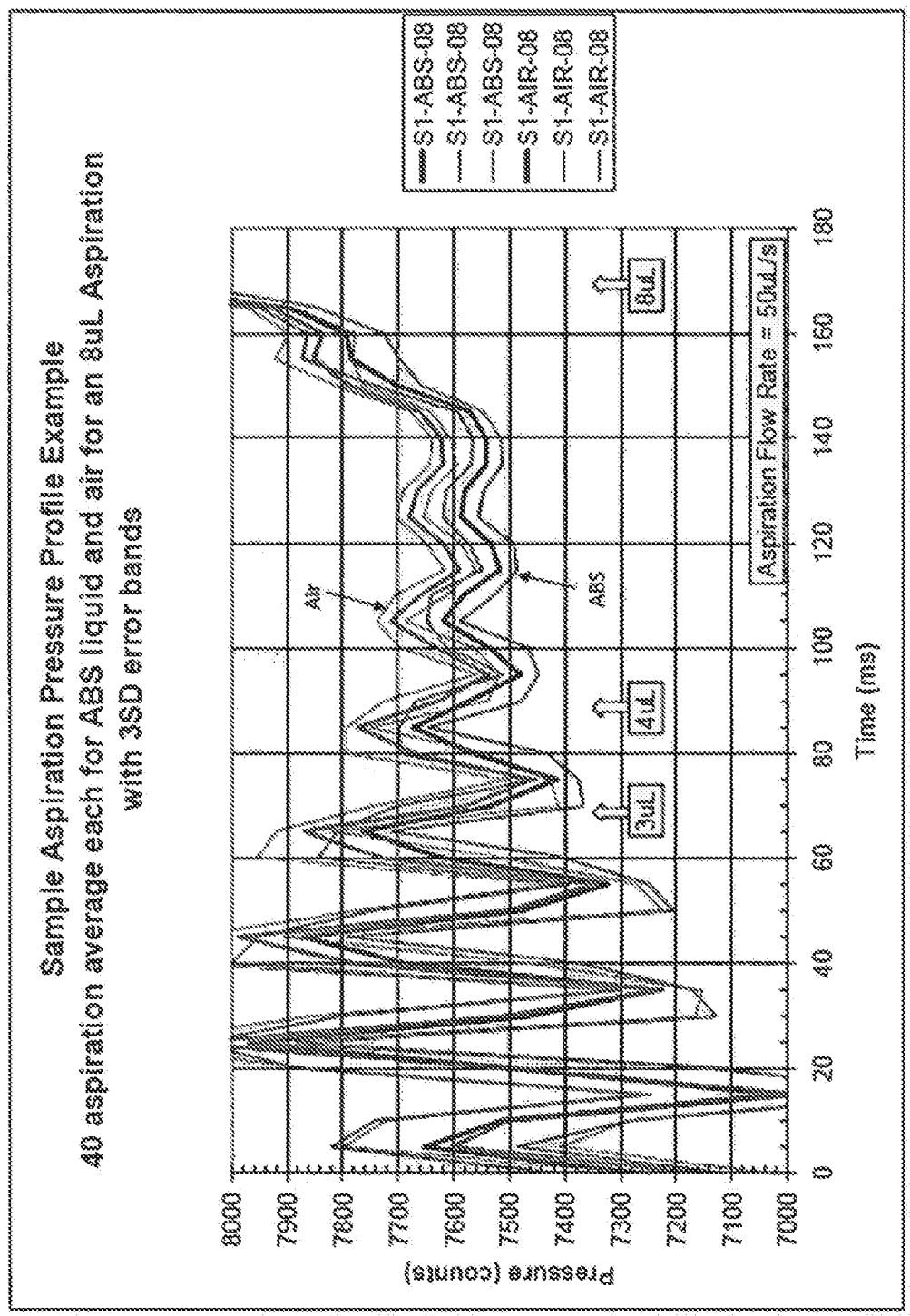
FIG. 6 is a graphical example of raw pressure output of an 8 µL liquid and air aspiration.

Referring to FIG. 6, another graphical example of the pressure output during an 8 μL sample aspiration is shown. Again, both ABS and air are graphed. In this example, the aspiration lasts approximately 170 ms, and has a relatively low flow rate (e.g., 50 μL/s). Additionally, the data in this embodiment has been summarized as a mean curve with three (3) standard deviation error bands surrounding each curve. As can be seen, separation between the two curves is small, and the error bands overlap in many areas. Furthermore, it is clear that, if the phase were to shift between the air and the liquid aspirations, there would be negative separation in some cases.

Figure 7:
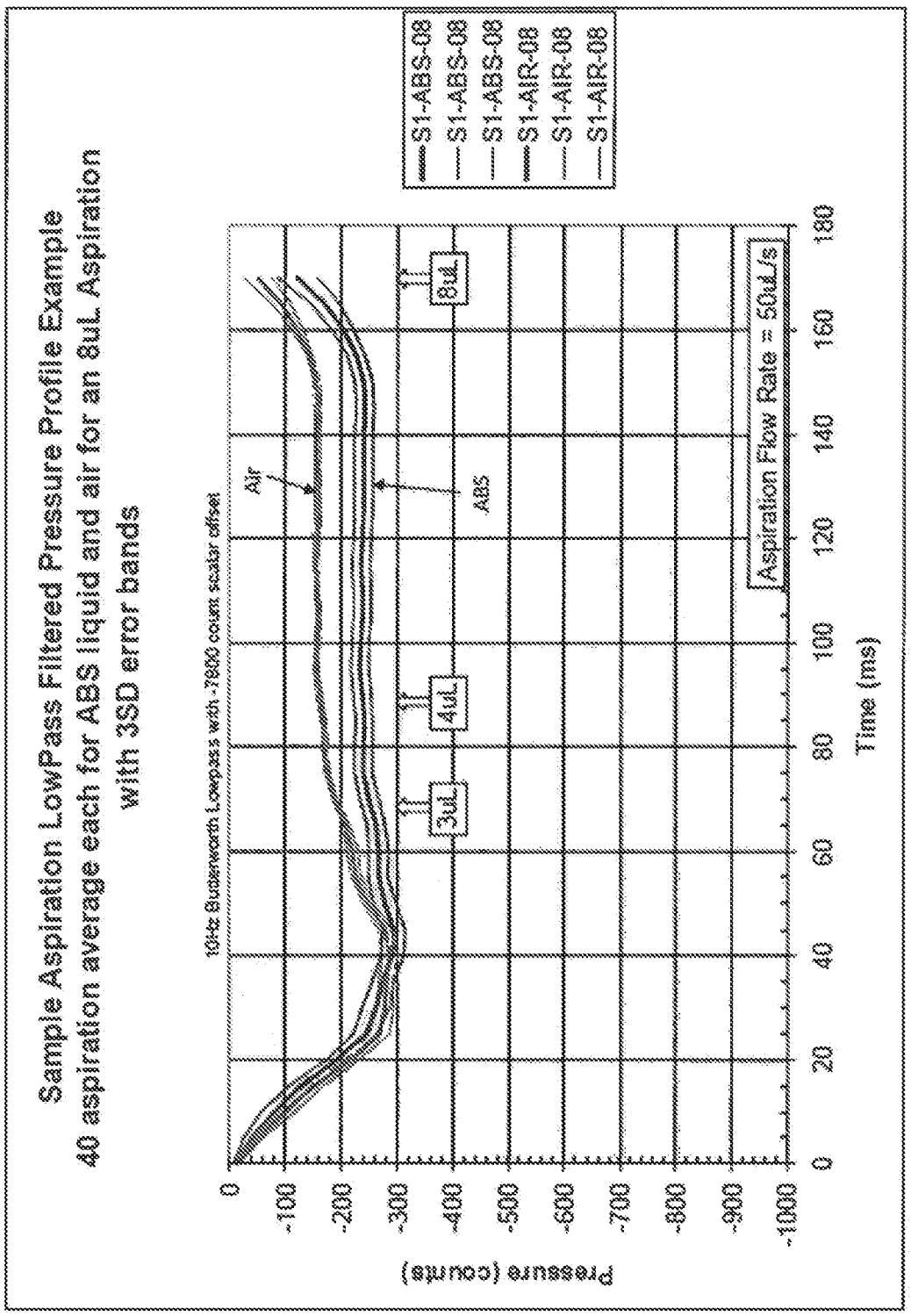
FIG. 7 is a graphical example of a filtered pressure signal from an 8 µL liquid and air aspiration.

Alternatively, FIG. 7 graphically displays the same data after applying the filter transform, on the same relative scale (e.g., 1000 pressure counts). A significant portion of the aspiration pressure is now visibly stable (FIG. 7), and there are nearly twelve (12) standard deviations of difference between the mean(s) of the pressure curves near the end of the aspiration process. Thus, in one embodiment, a measurement of the liquid aspiration pressure near the end of the aspiration could be compared with a previously established air aspiration pressure baseline to determine whether or not air or liquid had been aspirated. Because of the high statistical difference between the two aspiration pressures, there is little to no chance of an embodiment detecting a false aspiration error.

In another embodiment, the use of digital implementation for filtering the pressure signal may have the advantage that the filter can be easily adjusted to account for a wide range of aspiration conditions. By way of specific example, a long, (e.g., 500 ms) aspiration may contain the aspiration quality information at a low frequency (e.g., 1 Hz). Thus, the filter can be adjusted to attenuate frequencies of just several hertz or more. However, if the same mechanism also performs a short (e.g., 50 ms) aspiration, the information may be contained in a 10 Hz signal. Thus, an embodiment may increase the attenuation to higher frequency so as to not degrade the information-containing portion of the signal.

Moreover, if a noise frequency is known to be close to an information frequency, the order of the filter and/or the frequency band(s) of the filter may be increased to create a sharper cut-off (e.g., higher attenuation rate) between the information frequency and the attenuated noise frequencies. Modern Digital Signal Processors (DSPs) are adept at performing this type of signal analysis. Thus, an embodiment may, using this technique, take advantage of the ability to process the raw pressure signal from the transducer at or near the source with a DSP. A single numerical measurement may then be transmitted to a host computer. This method would help limit the bandwidth usage for the pressure measurement process on the communications network.

For example, the digital implementation of a 2nd order Butterworth low pass filter takes the form of:

$$y[i] = a_0 x[i] + a_1 x[i-1] + a_2 x[i-2] - b_1 y[i-1] - b_2 y[i-2]$$

wherein:
y[n]=filtered data
x[n]=unfiltered data
$a_n, b_n$=filter coefficients

In one embodiment, the filter coefficients may be defined by the desired cutoff frequency and the sampling rate. This cutoff frequency may be implemented on a filter within DSP code in order to simplify the process. In a further embodiment, it may be determined that using different filter coefficients for the acceleration, slew, and deceleration phases of the pump motion can be beneficial. It is also possible to utilize the same filter coefficients for the entire pressure curve.

In another embodiment, when multiple sets of filter coefficients are applied, the coefficients can be changed during a single pass through the dataset. This avoids any discontinuities from processing the data in a piecewise fashion. Factors impacting the pressure signal may be, for example, the pressure drop during an aspiration is dictated by the following factors: (1) liquid or gas properties (e.g., density, dynamic viscosity, etc.) (2) flow rate, and (3) probe and tubing diameters and lengths. In one embodiment, this can be demonstrated with an analysis using the Bernoulli equation for the steady state portion of the aspiration as follows:

| P = Pressure | D = Density | g = Gravitational constant |
|---|---|---|
| α = Energy correction factor | v = Velocity | h = Height |
| $h_L$ - Head Loss | $K_L$ = Head loss factor | Q = Flow rate |
| A = Area | f = Friction factor | l = Length |
| D = Hydraulic diameter | $R_e$ = Reynolds number | μ = Dynamic viscosity |

$$\frac{1}{\rho_1 g} P_1 + \alpha_1 \frac{v_1^2}{2g} + h_1 = \frac{1}{\rho_2 g} P_2 + \alpha_2 \frac{v_2^2}{2g} + h_2 + h_L$$

$$\frac{1}{\rho} P_1 + \frac{v_1^2}{2} + gh_1 = \frac{1}{\rho} P_2 + \frac{v_2^2}{2} + gh_2 + g \sum K_{L_n} \frac{v_n^2}{2g}$$

$$P_1 + \rho \frac{v_1^2}{2} + \rho g h_1 = P_2 + \rho \frac{v_2^2}{2} + \rho g h_2 + \frac{\rho}{2} \sum K_{L_n} v_n^2$$

$$P_1 + \frac{\rho}{2} \frac{Q^2}{A_1^2} + \rho g h_1 = P_2 + \frac{\rho}{2} \frac{Q^2}{A_2^2} + \rho g h_2 + \frac{\rho}{2} \sum K_{L_n} \frac{Q^2}{A_n^2}$$

$$P_1 = P_2 + \frac{\rho}{2} Q^2 \left( \frac{1}{A_2^2} - \frac{1}{A_1^2} \right) + \rho g (h_2 - h_1) + \frac{\rho}{2} Q^2 \sum \frac{K_{L_n}}{A_n^2}$$

$$P_2 = P_1 - \frac{\rho}{2} Q^2 \left( \frac{1}{A_2^2} - \frac{1}{A_1^2} \right) - \rho g (h_2 - h_1) - \frac{\rho}{2} Q^2 \sum \frac{K_{L_n}}{A_n^2}$$

where:

$$K_{major} = f \frac{1}{D}$$

$$K_{minor} = \sum MinorLossFactors$$

$$K_L = K_{major} + K_{minor}$$

$$R_e = \frac{\rho v D}{\mu}$$

$$f = \frac{64}{R_e} \text{ for laminar flow } R_e < 2100$$

$$f \approx 0.4812 \, R_e^{-0.3016} \text{ for turbulent flow in a smooth pipe}$$

for $3000 < R_e < 10.000$

When comparing two aspiration events for the same probe (e.g., an air aspiration versus a liquid aspiration or two liquid aspirations of different viscosities), during a case of a constant cross-section probe, we can assume differences in the P1 (atmospheric) term, kinetic energy term, potential energy term (pressure head), and the minor loss term are essentially equivalent across the two cases. However, it should be noted that, in the case of the air aspiration, the pressure head term may change slightly during the course of the aspiration. Therefore, assuming the terms are essentially equivalent, the term with the most significant difference between subsequent aspirations is the major loss term or pipe friction term. In one embodiment, the clinical diagnostic analyzers may have a probe diameter(s) and aspiration speed(s) such that the flow is nearly always strongly laminar; thus, the frictional loss is inversely proportional to the Reynolds number. Therefore, if we consider solely the major loss term, the driving factors for the pressure differences become apparent:

$$K_{major} = f \frac{1}{D}$$

$$= \frac{64 \mu A l}{\rho Q D^2}$$

$$P = -\frac{\rho}{2} Q^2 \sum \frac{K_{L_n}}{A_n^2}$$

$$= -\frac{\rho}{2} Q^2 \sum \frac{\frac{64 \mu A l}{\rho Q D^2}}{A^2}$$

$$= -\frac{128}{\pi} Q^2 \mu \frac{1}{D^4}$$

$$\Delta P = -\frac{128}{\pi} Q \frac{1}{D^4} (\mu_B - \mu_A)$$

Thus, in an embodiment, the difference in pressure ($\Delta P$) between two aspirations may be linearly related to the flow rate, the length of the probe, and the difference in viscosities between the two fluids (A and B). Moreover, it may be inversely related to the fourth ($4^{th}$) power of the diameter. Thus, an embodiment's effect may maximize pressure differences with higher flow rates and smaller diameter probes.

Based on the factors discussed herein, an embodiment may comprise several criteria for optimizing the design of a pipetting system for aspiration/dispense quality assessment using pressure detection. Critical factors in the design of a pipetting system with pressure quality assessment may include, for example: the pressure change to be detected must be larger than the measurement noise (dictated by the probe/tube diameter, the aspiration rate, and the range of viscosities of the fluids to be evaluated); the aspiration duration being longer than the initial pressure transient (dictated by aspiration volume and speed, fluid viscosity, and the dynamics of the fluid system (e.g., tubing lengths, pump acceleration rates, etc.)); and the pressure signal noise (i.e., non-information containing frequencies present in the system) being contained to as high a frequency range as possible such that no low frequency vibrations or system resonances should be present (dictated by the mechanism and fluidics design coupled with flow rates).

Figure 8:
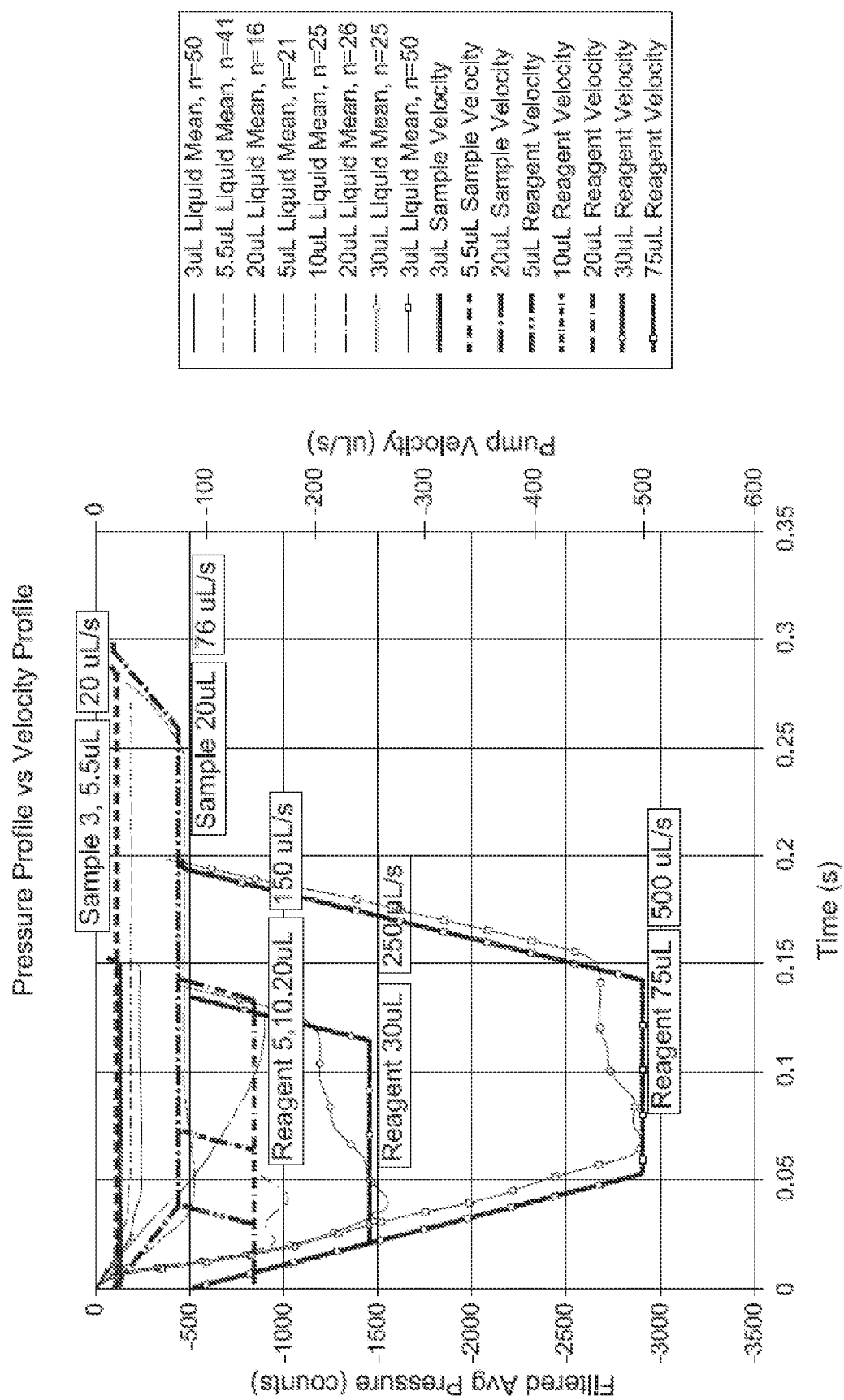
FIG. 8 is a graphical example of filtered pressure curves compared with aspiration velocity profiles for a range of volumes and flow rates.

Thus, once these factors are known and accounted for, an embodiment's algorithm may be tailored to a range of aspiration conditions for optimized analysis. FIG. 8 graphically illustrates example pump velocity profiles (e.g., in µL/sec) against filtered pressure curves. Once an embodiment applies the filter, the pressure curves may match the velocity profiles as expected. A slight overshoot of the pressure can be seen as the pressure drops during the acceleration phase; this is the initial transient that occurs in the pressure signal due to the dynamics of the system. During this transient, the pressure is not a reliable indicator of metering quality and, thus, very short aspiration times make quality measurements difficult.

Figure 9:
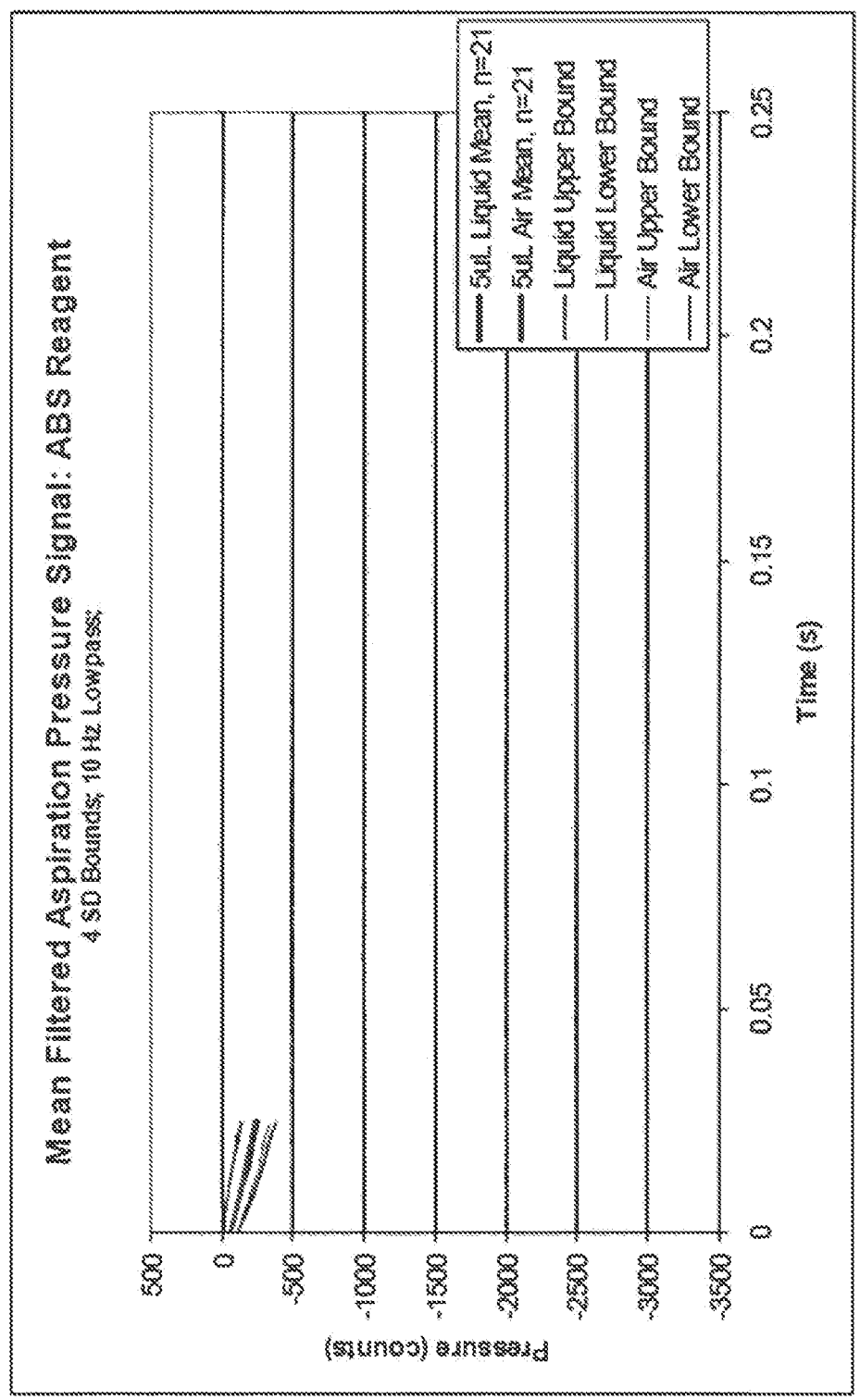
FIG. 9 is a graphical example of an aspiration that cannot be distinguished from air due to low flow rate and short aspiration time.
Figure 11:
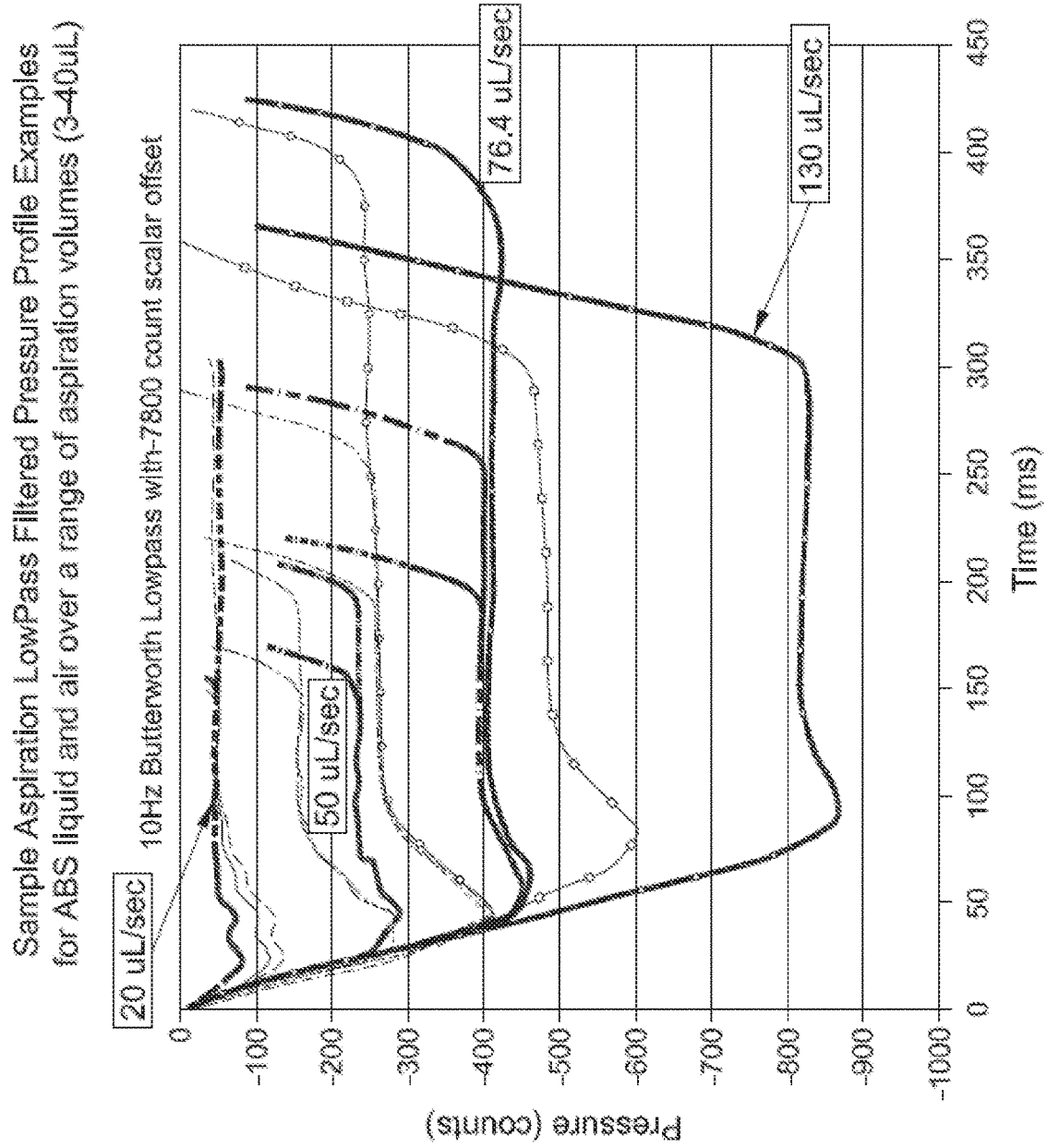
FIG. 11 is a graphical example of filtered aspiration pressure curves for a range of sample aspirations.
Figure 12:
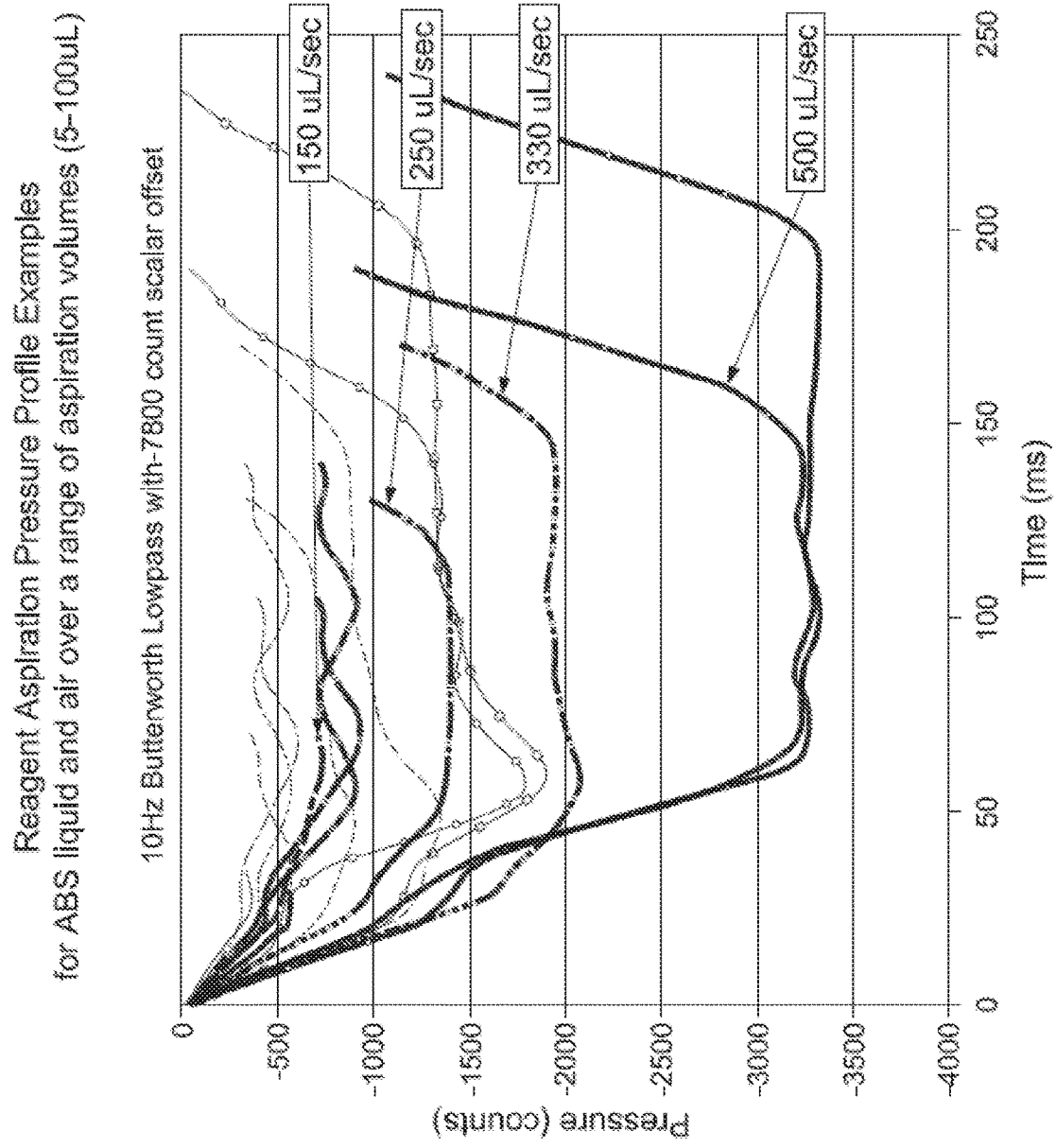
FIG. 12 is a graphical example of filtered aspiration pressure curves for a range of reagent aspirations.

This difficulty can be seen in the 5 µL aspiration in FIG. 9. The effect of aspiration flow rate can also be seen in FIGS. 11 and 12. Thus, in one embodiment, as flow rate increases, pressure decreases, whether aspirating liquid or air. The difference between an air or liquid aspiration may increase proportionately as well. It should also be noted that aspirations of varying volumes that have the same flow rate also have similar pressure drops.

Figure 10:
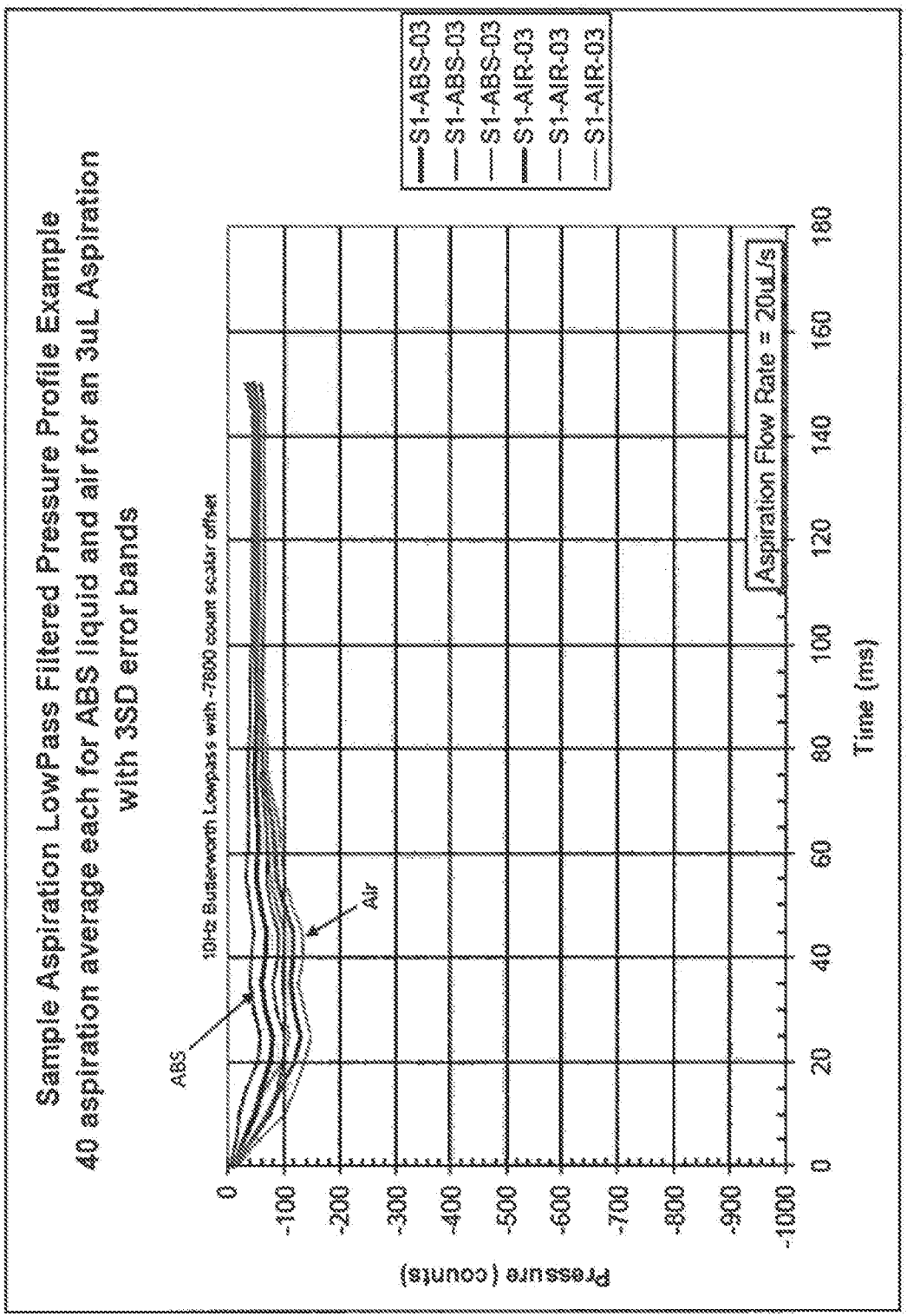
FIG. 10 is another graphical example of an aspiration that cannot be distinguished from air due to low flow rate and short aspiration time.

Conversely, in one embodiment, as flow rate decreases, the difference between liquid and air aspiration shrinks to the point that the difference is smaller than the variability of the measurement and, thus, the two are indistinguishable. Based on this, an embodiment may assume a lower limit for aspiration flow rate for a given system. A closer look at this phenomenon can be had in FIG. 10, where a 20 µL/s flow rate exhibits an essentially equivalent steady-state pressure drop for liquid and air. Interestingly, the initial pressure transient overshoot for the air aspiration case is consistently greater than that for liquid. Thus, an alternate measurement could be used to distinguish the two (e.g., evaluating the pressure difference at the end of the acceleration rather than prior to deceleration). In a further embodiment, this initial separation may be increased with higher pump accelerations, which create a larger overshoot.

Figure 13:
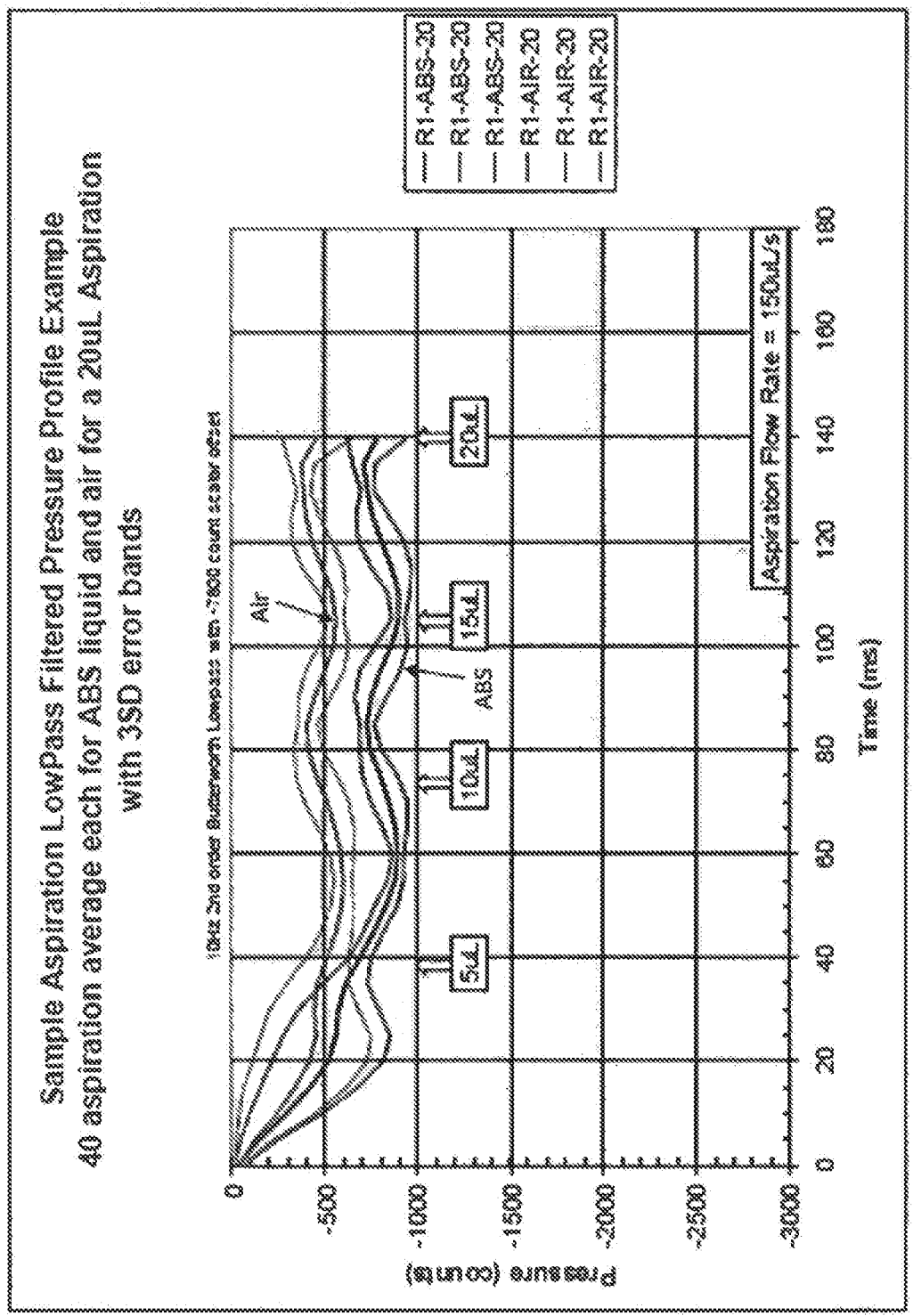
FIG. 13 is a graphical example of the effect of adjusting filter parameters on an example pressure curve.

In one embodiment, the difference between the bandwidth frequency of the aspiration and the frequency of the unwanted pressure signal noise is a third factor to be considered in the design of the system. Ideally, any noise should be significantly higher in frequency than that of the aspiration motion for ease of separation of the two. Thus, the fluidics and associated mechanical systems should be sufficiently stiff to avoid low-frequency vibrations. However, employment of the digital filter allows for relatively easy adjustment to accommodate different operating conditions of the fluidics. A non-limiting example is shown in FIG. 13, where a 150 µL/s aspiration lasting 140 ms is filtered with a 2nd order 10 Hz low pass Butterworth filter, and still exhibits an oscillation in the pressure signal. In this embodiment, the oscillation is related to the pump speed and the dynamics of the system. Thus, the oscillation noise cannot be removed from the system. If the oscillation cannot be removed or minimized by some means (e.g., changing pump speeds or system hardware), then in one embodiment, the filter can be adjusted to create a higher attenuation of frequencies above the cutoff frequency.

Figure 14:
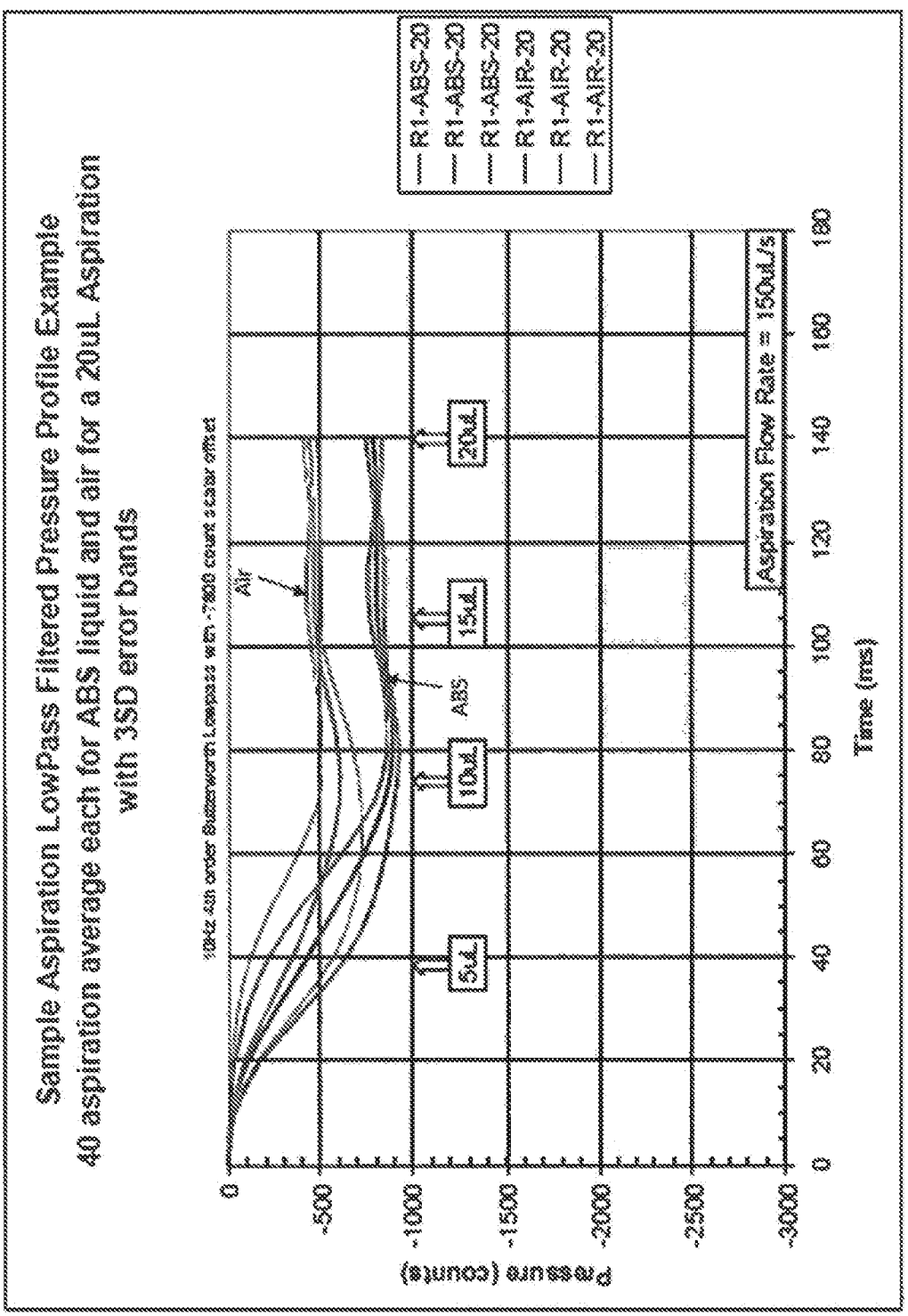
FIG. 14 is another graphical example of the effect of adjusting filter parameters on an example pressure curve.

Thus, referring to FIG. 14, an embodiment, as shown, may consist of the same data as FIG. 13, but show no oscillation when the order of the filter is increased to four from two. This may come with a cost, namely that the filter is slower in responding; however, this is of no consequence for this particular aspiration. Thus, another advantage of this technique is that it can be tailored to the needs of a particular aspiration profile and mechanical system, and/or changed "on the fly" from one aspiration to the next.

Figure 15:
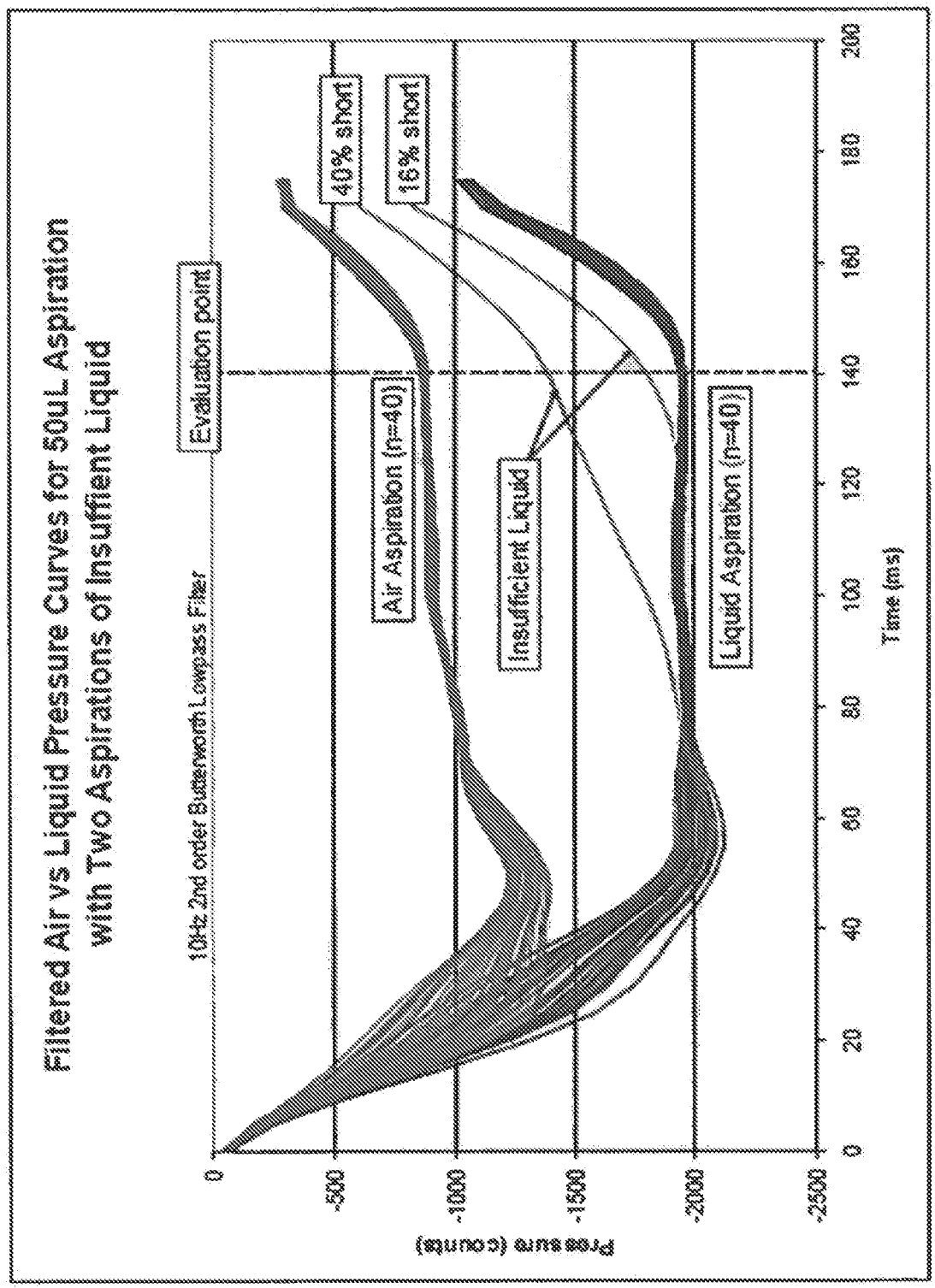
FIG. 15 is a graphical example of short aspiration detection using filtered pressure and second derivative shape curves.
Figure 16:
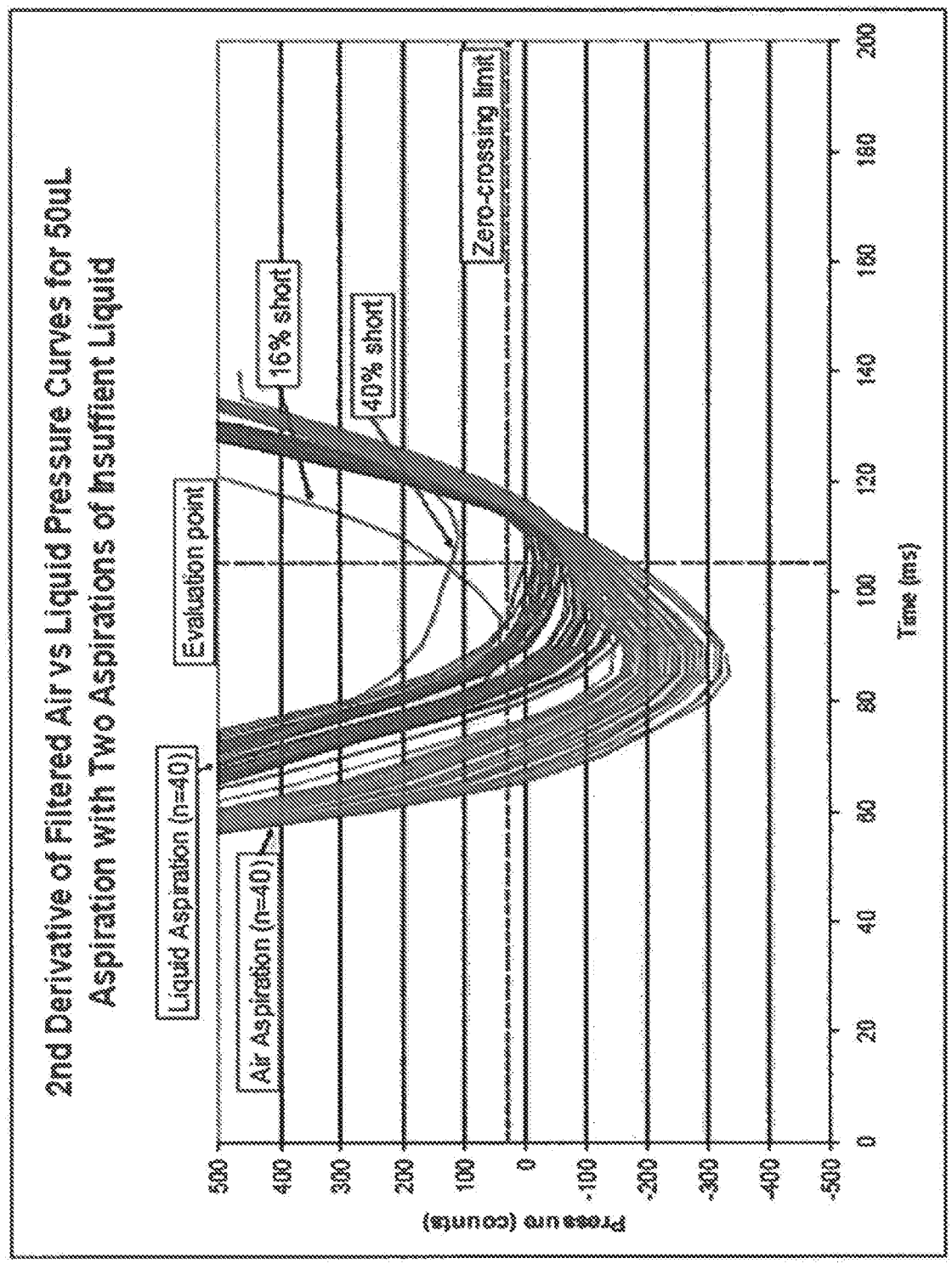
FIG. 16 is another graphical example of short aspiration detection using filtered pressure and second derivative shape curves.

In another embodiment, an example of how this filtering technique can be used for enhanced detection of short aspirations is shown in FIG. 15. Numerous aspirations of air and ABS are shown. During two of those liquid aspirations (i.e., labeled insufficient liquid), insufficient liquid was available, resulting in a "short" aspiration. Photometric analysis of the transferred material revealed that these two (2) aspirations were 40% and 16% short, respectively. It should be noted that while the 40% short aspiration is clearly separated from the normal at the end of the steady-state aspiration (~140 ms), the 16% short aspiration is somewhat difficult to distinguish. However, because the filtered aspiration profiles are so well behaved, an embodiment can apply a second derivative algorithm to evaluate the "shape" of the curve. With this analysis in place, the 16% short curve is as distinguishable as the 40% curve, as shown in FIG. 16. Prior to the filtering technique described herein, this type of "shape" analysis was not possible to perform on liquid-coupled systems.

Figure 17:
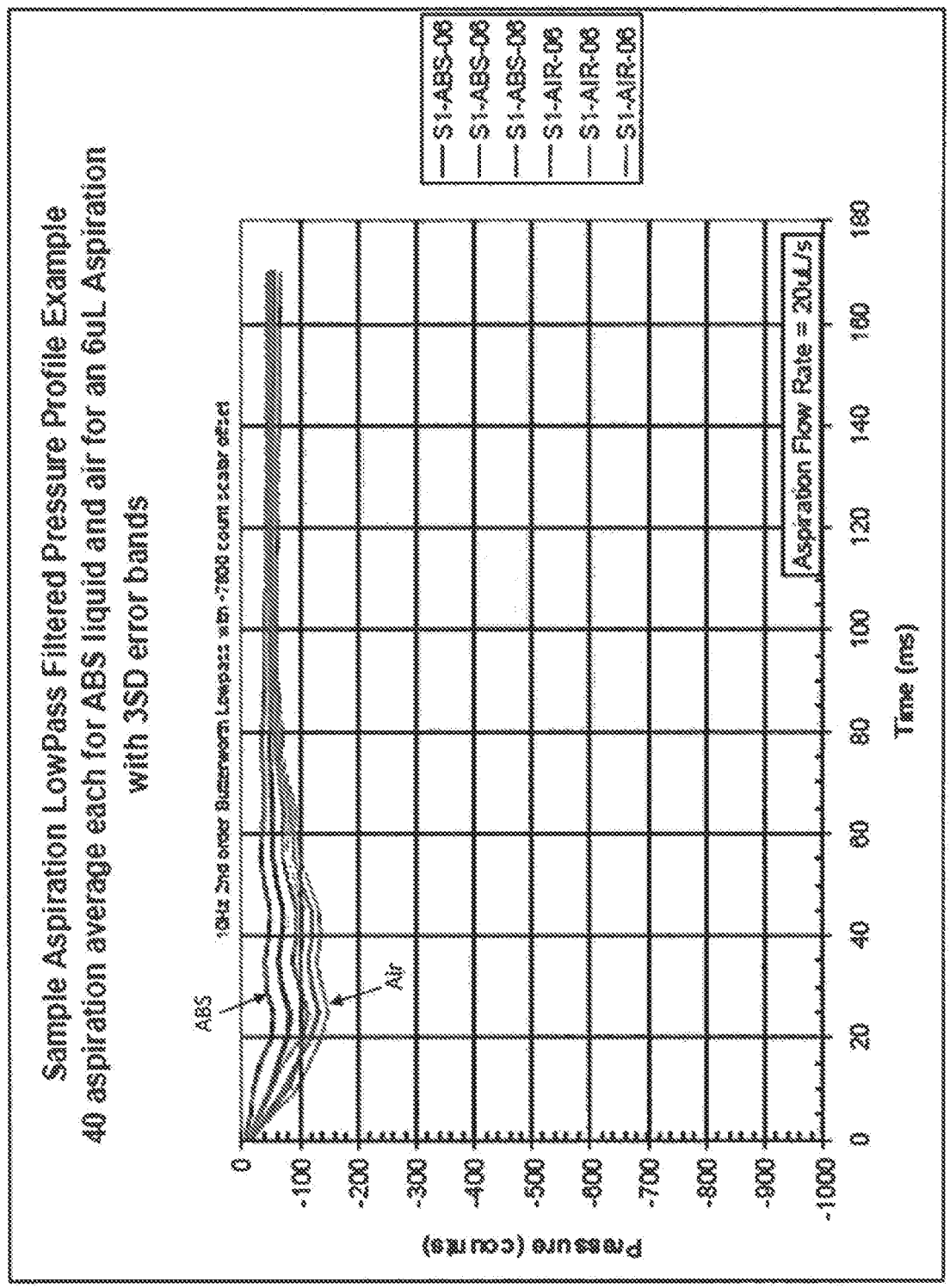
FIG. 17 is a graphical example of a 6 μL sample aspiration at 20 μL/s.

A second example embodiment demonstrates how this technique can be used to optimize a system for making aspiration quality measurements at low volumes. FIG. 17 shows the filtered pressure curve for a 6 μL sample aspiration at 20 μL/s (similar to FIGS. 9 and 10). Due to the low flow rate, liquid and air aspirations cannot be distinguished because the difference between the two is less than the other variations in the measurement. As stated herein, the pressure differences can be magnified by reducing the probe diameter or increasing flow rate.

Figure 18:
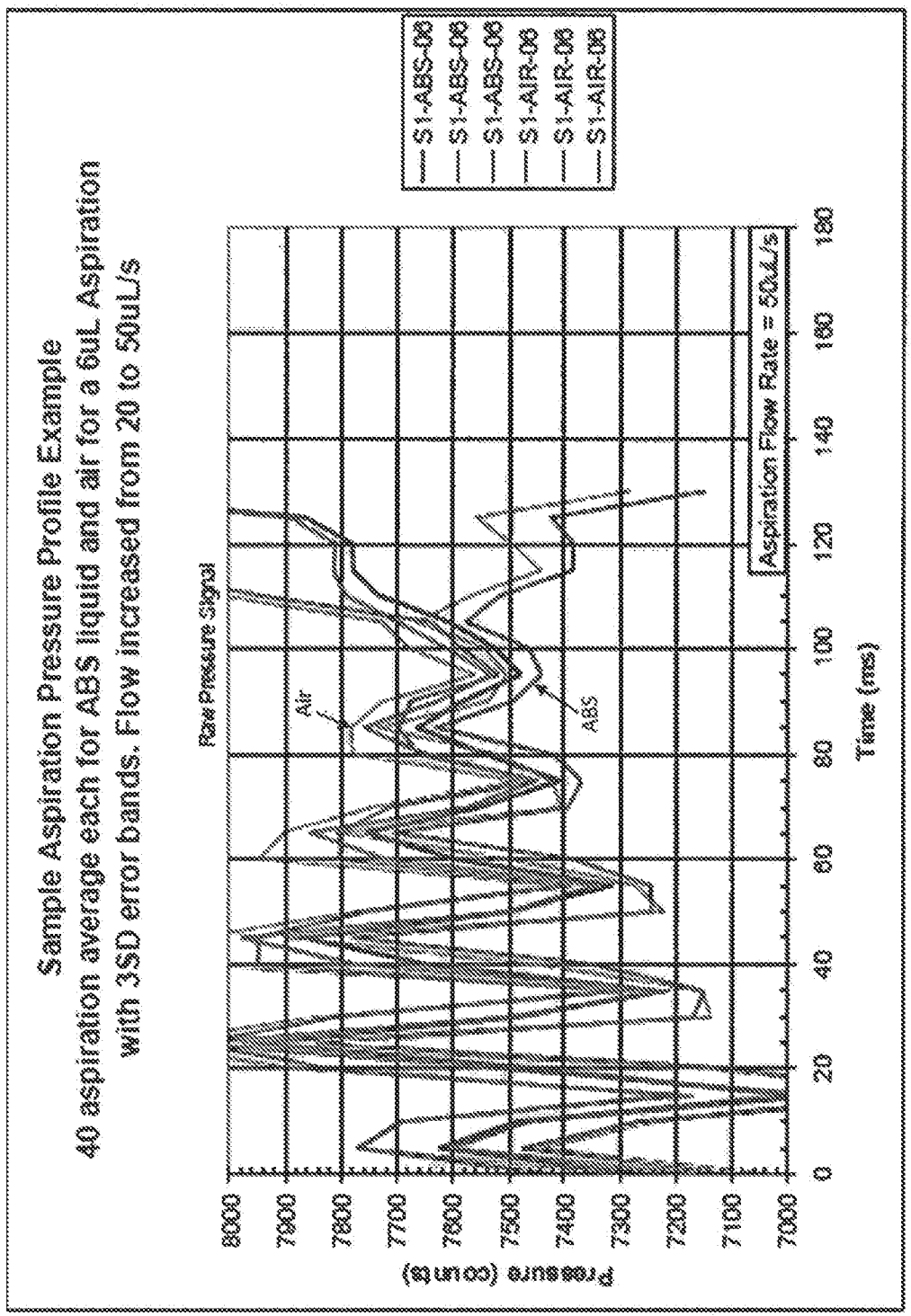
FIG. 18 is a graphical example of a 6 μL raw pressure signal and a filtered pressure signal at 50 μL/s.
Figure 19:
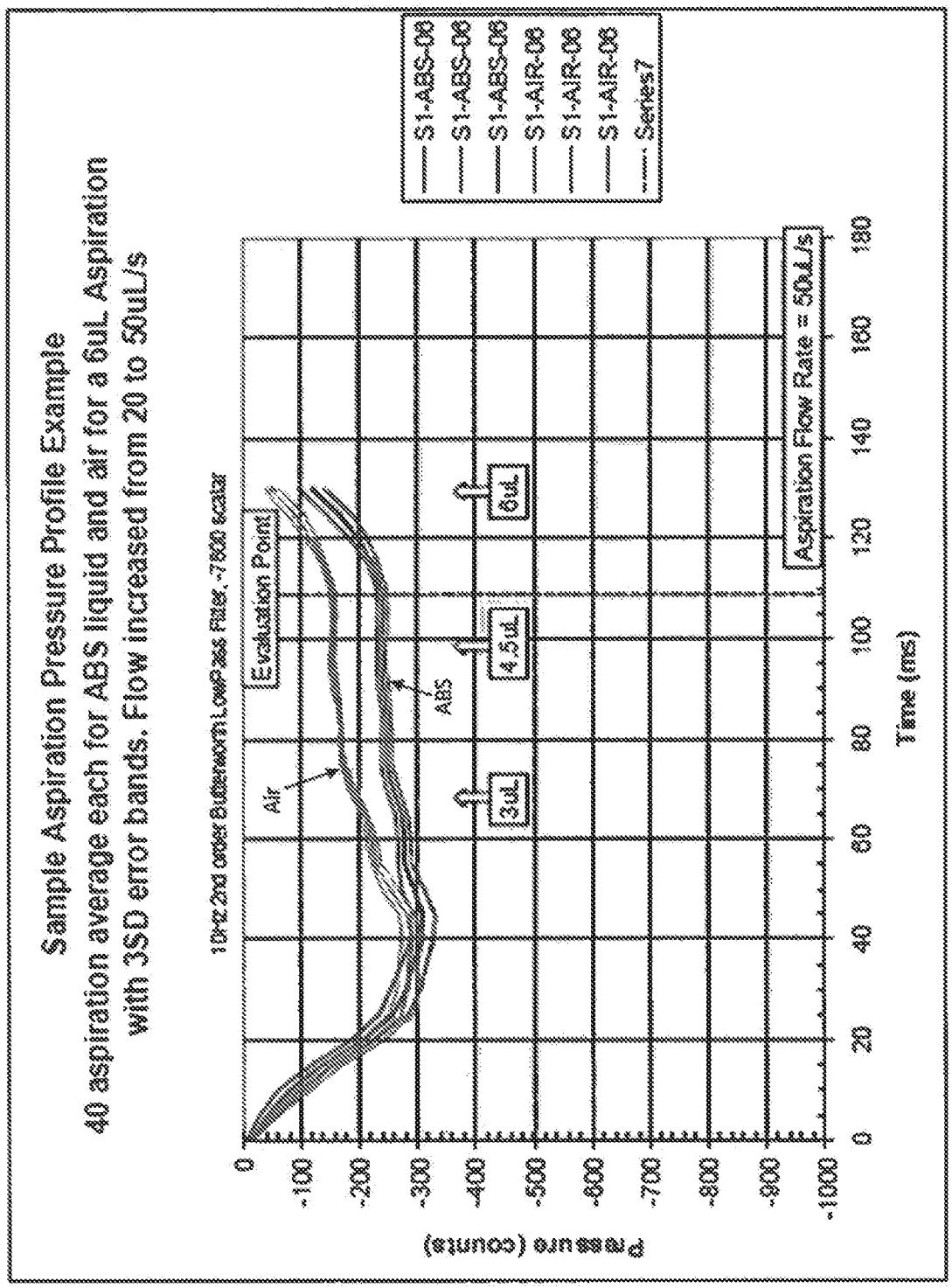
FIG. 19 is another graphical example of a 6 μL raw pressure signal and a filtered pressure signal at 50 μL/s.
Figure 20:
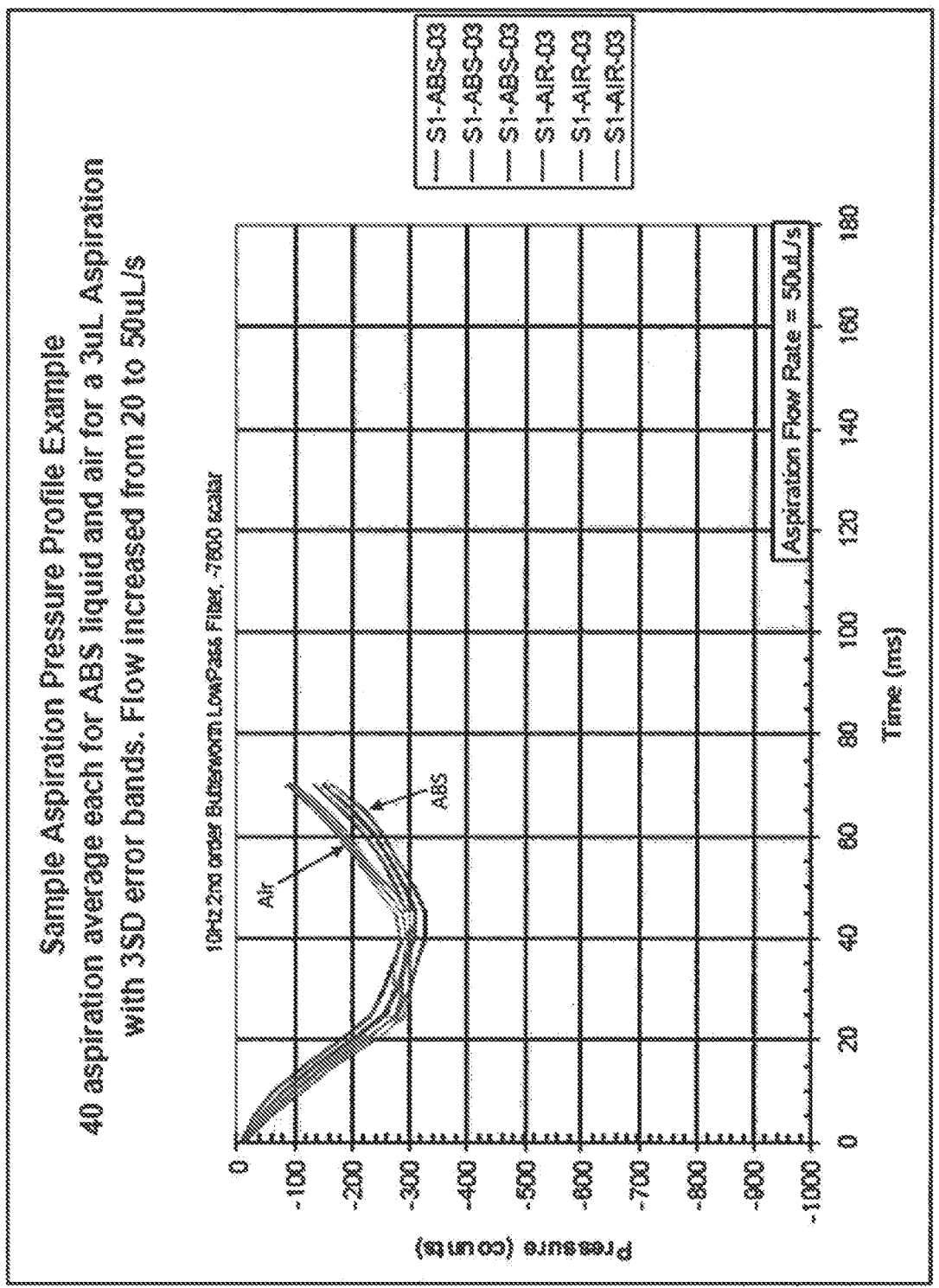
FIG. 20 is a graphical example of a 3 μL sample aspiration at 50 μL/s.

Thus, an embodiment may choose the latter and increase the aspiration flow rate to 50 μL/s, the difference between the two pressure curves becomes clear with about 18 standard deviations of separation, as can be seen in FIGS. 18 and 19. The filtered liquid aspiration pressure signal can be evaluated at a single point (e.g., immediately prior to the pump deceleration at 109 ms), and compared with a reference air aspiration signal at the same flow rate. If the supposed liquid aspiration pressure is less than that predefined reference value, then it can be said that liquid was indeed aspirated (i.e., sufficient sample was present). FIGS. 18 and 19 are also a further example of the power of this technique, as the clear separation seen in FIG. 19 is obtained from a very difficult to interpret raw pressure signal (as shown in FIG. 18). Clearly, aspiration volumes even lower than 6 μL can be analyzed with limited separation of signals at volumes as low as 3 μL, such as shown in FIG. 20, at this flow rate.

Lastly, it can be noted that, if the reference value is obtained by establishing a mean value through multiple aspirations, the effective variability of the reference signal is reduced, and the separation (in terms of standard deviations) between reference and measurement pressures can be further increased for any given condition.

Existing methods for determining aspiration or dispense quality has been ineffective for low transfer volumes and limited in scope in liquid-coupled metering systems. Accordingly, an embodiment offers an improved technique, which extracts the relevant information from a pressure signal during aspiration, and then analyzes it for various attributes of a quality aspiration. The attributes may include partial or complete clog detection, short or insufficient sample detection, liquid-liquid or liquid-air differentiation, and aspiration abnormalities. This technique has been demonstrated to be applicable with aspiration volumes at least as low as 3 μL, but could theoretically work for any volume if the system parameters are optimized.

Thus, an embodiment provides a technique including: acquisition of a set of pressure measurements spanning the duration of the aspiration; processing of the set of pressure measurements in the frequency domain and subsequent attenuation of unwanted frequencies; analyzing the processed signal in the time domain, comparing one or more pressure measurements from a predetermined point during the aspiration against a predetermined or calibrated value; analyzing the processed signal in the time domain, using first, second, or higher order derivatives of the processed signal, and comparing one or more measurements from a predetermined point during the aspiration against a predetermined or calibrated value; and using those comparisons to determine the quality of the aspiration with regards to obstructions to the aspiration, insufficient liquid aspirated, type of fluid aspirated, or anomalous aspiration events.

A further embodiment also provides: a method for optimizing a system for low volume pressure measurements that includes: sizing the probe and tubing diameters, the aspiration rates and durations, the range of viscosities of fluids to be evaluated, and tuning the dynamics of the fluid system to separate noise frequencies from information frequencies.

Further described herein is the data processing algorithm used to determine if a fluid was successfully aspirated or if a short or clog has occurred. In one embodiment, an algorithm, which is used to determine if a fluid was successfully aspirated or if a short or clog has occurred, may be based on a mathematical model that describes the expected pressure curves generated by a constant flowing fluid with a given viscosity and density. An embodiment may use the algorithm to determine what viscosity and density parameters best fits the model to the observed data. The algorithm may then return the estimated viscosity, density, and a goodness of fit measure that indicates how well the model fits the observed pressure data. In a further embodiment, error logic is applied to the three measures to determine if the aspiration was successful or if a clog or short occurred. If the model fits the data well and the estimated viscosity and density are within the expected range, then the algorithm deems the aspiration successful. If the viscosity or density is too great, then it can be assumed that a clog occurred. If neither case holds true, then an embodiment may assume a short sample occurred.

Figure 21:
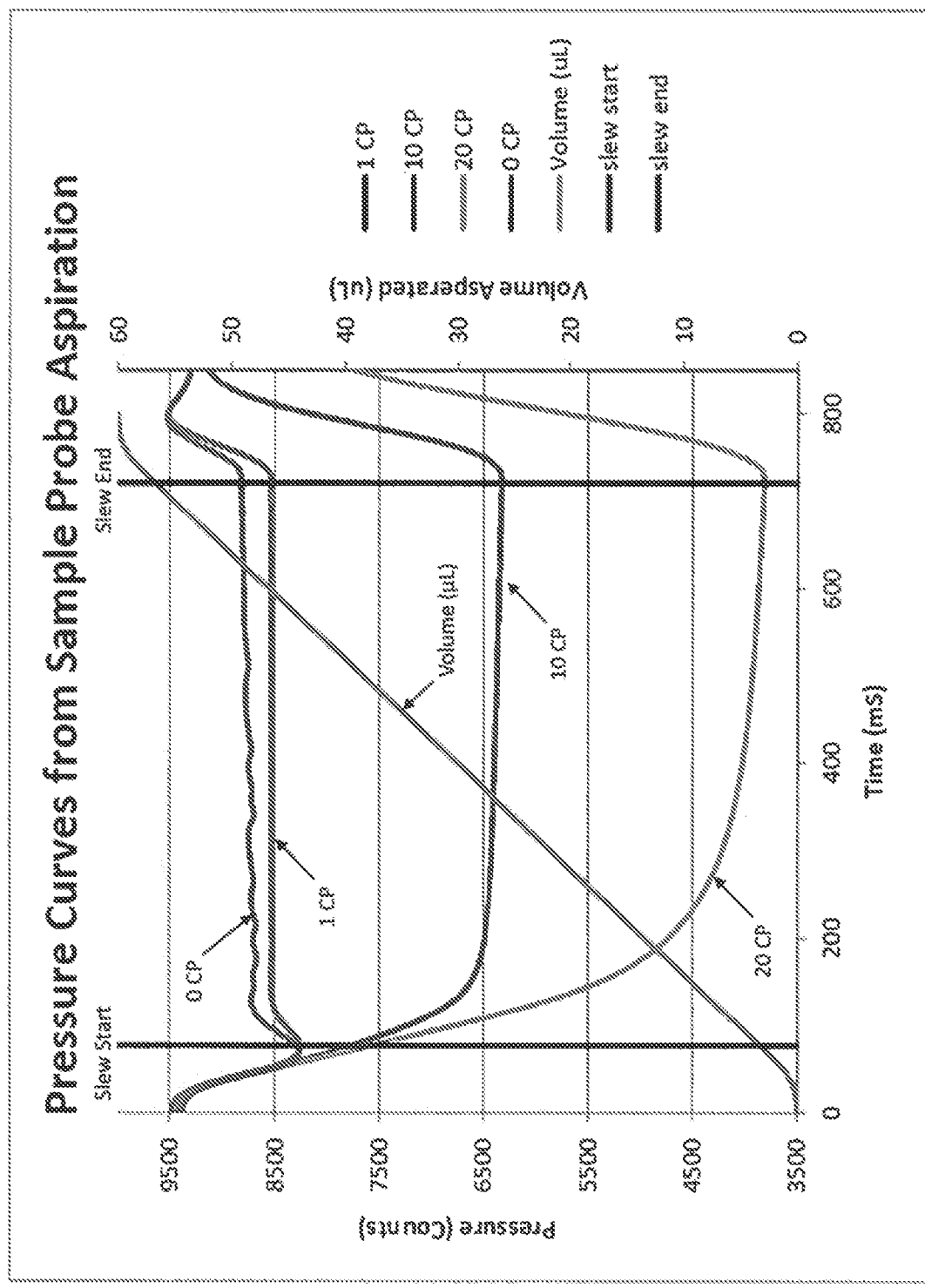
FIG. 21 is a graphical example of pressure curves for 4 key viscosities.

Referring now to FIG. 21, an example graphical illustration shows the effects that different viscosities (and densities) have on their pressure curves. The curve labeled "0 CP" represents the pressure generated by air, which has a viscosity of 0 cp. The curve labeled "1 CP" represents pressure generated by water with viscosity 1 cp. The curves labeled "10 CP" and "20 CP" represent water/glycerol solutions with viscosities 10 and 20 cp. The volume aspirated over time is shown by the curve labeled "Volume (μL)" and corresponds to the right axis. The region between the vertical lines represents the time when fluid flow is constant.

Thus, the figure clearly shows that the steady state pressure drops become greater as viscosity increases. This is mainly due to the larger force required to overcome the frictional impedance of moving the fluid through the narrow tip of the probe. Also note the steady state slopes of the curves. Air has a slightly upward sloping pressure, while the water/glycerol solutions produce downward sloping pressures during the slew portion of the curves. Water has a constant slope and remains flat once steady state is reached. This is due to the changing head pressure caused by the decreasing/increasing weight of the sample being aspirated. Since the system is water coupled, there is no change in weight when water is aspirated. When air is aspirated, the total weight of the fluid in the probe continuously decreases as more and more air is drawn in, causing the upward slope. The same affect occurs when heavier solutions are drawn into the probe, with the exception that the slope is now downward.

Based on these observations, an embodiment utilizes a new mathematical model to explain this phenomenon. Assuming the flow is constant and laminar, one can formulate an equation using a combination of Hydrostatic principles and the Hagen-Poisseville Equation. Considering the gain and offset errors of the pressure sensing electronics, the resulting pressure counts in the slew region of the curve is given by:

$$C(t)=mt+b=\text{pressure counts from PCA}$$

where:

$$m = -\lambda_{ProbeBody}\Delta\rho$$

$$b = \lambda_{SystemOffset} - \lambda_{PCA}x - \lambda_{ProbeTip}\mu$$

$\lambda_{ProbeBody}$=Gain of Sensor Electronics and Mechanical Dimensions of the Probe's Body
$\lambda_{SystemOffset}$=Offset due to Sensor Electronics and Head Pressure when probe is at home
$\lambda_{PCA}$=Gain of Sensor Electronics
$\lambda_{ProbeTip}$=Gain of Sensor Electronics and Mechanical Dimensions of Probe's Tip
x=Probe Position
$\Delta\rho$=Change in fluid density relative to water
$\mu$=Fluid Viscosity In order to estimate the fluid's viscosity and density, an embodiment utilities an algorithm that applies this model to the observed pressure data. To do so, a best fit line is applied to the stable slew portion of the pressure data. This produces a line that has a mathematical relationship with both viscosity and density. As seen in the equation above, the line's slope, m, is directly proportional to the fluid's density, and can be used as a descriptive statistic of the fluid. The y-intercept, b, is directly related to the fluid's viscosity, but also contains undesired factors due to the offset of the electronics, $\lambda_{SystemOffset}$, and to the head pressure due to the probe's height, $\lambda_{PCA}x$. These undesired factors are not constant, and will vary over time.

Drift in the electronics and variation in the probe's vertical position (e.g., because the fluid's level position varies from container to container) create this variation. These undesired factors are estimated and removed from the y-intercept calculation by subtracting out the static pressure reading that occurs after the aspiration. This produces a test statistic that is directly related to viscosity. The equation for this test statistic is defined by:

$$v_{viscosity}=C_{Static\,After\,Aspiration}-\hat{b}\hat{m}T=\lambda_{ProbeTip}\mu$$

wherein:

$C_{StaticAfterAspiration}$=Static Pressure counts after the aspiration
T=Length of the best fit line in time Notice in the above equation that $\varphi_{viscosity}$ now only contains one term that is directly proportional to the fluid's viscosity. Thus, an embodiment can now infer the fluid's unknown viscosity and density from the pressure curves by applying a best fit line to the stable portion of the curve and calculating the following tests statistics:

$$\varphi_{density}=\hat{m}$$

$$\varphi_{viscosity}=C_{StaticAfterAspiration}-\hat{b}-\hat{m}T$$

$\hat{m}$=Estimated slope of best fit line
$\hat{b}$=Estimated y intercept of best fit line
$C_{StaticAfterAspiration}$=Static Pressure counts after the aspiration
T=Length of the best fitline in time In another embodiment, a goodness of fit metric is determined to enable the algorithm to capture partial aspirations. Assuming an embodiment involves a clean aspiration, the observed pressure will have a constant slope and fit a line well. Alternatively, if an embodiment involves only a partial aspiration, which produces discontinuity, typically a step change, it will not fit well with a line. An embodiment may compute the RMS value of the residuals to measure the average error of the fit. However, this method has the tendency to average out sudden pulses in the curve that need to be captured. Thus, an embodiment may compute the range of the residuals, or the difference between the maximum and minimum residuals, as:

$$\varphi_{FitError}=\text{range}(\{\varepsilon_i:\forall i\})=\max(\{\varepsilon_i:\forall i\})-\min(\{\varepsilon_i:\forall i\})$$

where residuals are computed by:

$$\varepsilon_i=\text{pressure}(i)-\hat{m}i-\hat{b}$$

This ordered statistic method may detect any disruption without averaging it out.

Figure 22:
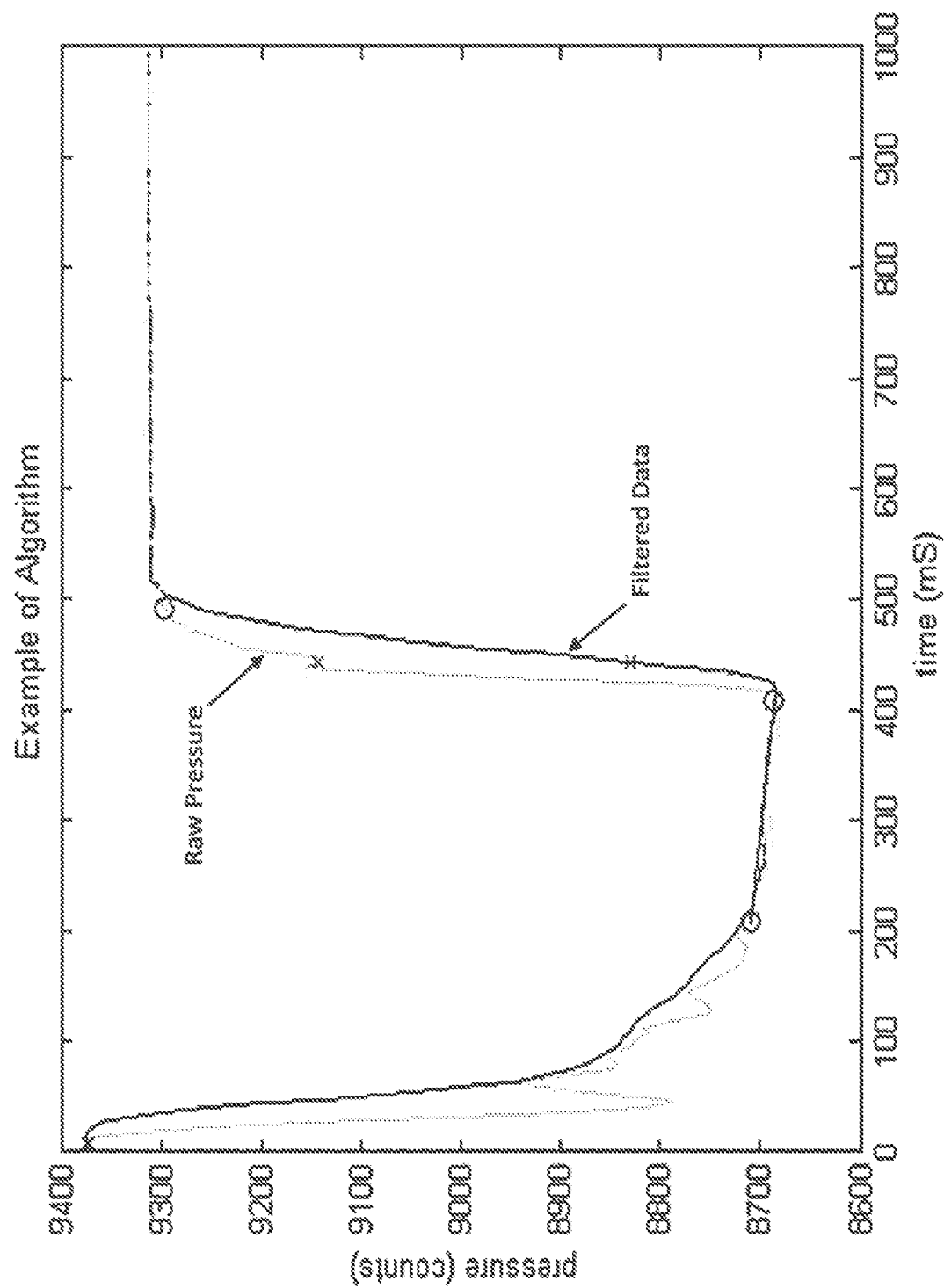
FIG. 22 is a graphical example of pressure data as used by an embodiment.

An embodiment may initialize an algorithm once the probe is submerged in a liquid. The HOST software may then command the DCM to collect pressure data at a predetermined sampling rate (e.g., 1 ms, 2 ms, 3 ms, 4 ms, etc.) per reading while simultaneously aspirating the sample. The HOST code may then wait for the DCM to complete its task, and then retrieve the raw pressure for post-processing. An example of raw pressure data is shown by the curve identified as raw pressure in FIG. 22. The "x"s in the plot represent the times when the pump was turned on and off. Once the DCM responds with data, the HOST may first take an average of three raw pressure readings that occurred 50 mS after the pump stopped. This value, shown by the circle, is stored as CStaticAfterAspiration, and will be used later to calibrate out the effects of hydrostatic head pressure due to probe's height. The HOST then applies a digital low pass filter to the raw data, reducing any noise due to outside influences or due to oscillating effects caused by the air gap between the sample and water coupled system. The filtered data greatly reduces the undesired fluctuations, and is shown in FIG. 22.

Once an embodiment has filtered the data, the HOST computes the best fitting line to the stable portion of the curve using ordinary least squares regression. The regression is applied at predetermined times after the pump starts and before the pump begins deceleration. The values of these acceleration and deceleration delays vary, depending on the pump speed parameters. The line with circled end points illustrates the regression line in FIG. 22. The regression produces the estimated slope, $\hat{m}$, and y intercept, $\hat{b}$, required to calculate the test statistics. In another embodiment, the HOST computes the residuals of the fit, finds the max and min values, and takes the difference between the two to compute the residual range. Mathematically, this is represented by:

$$\varphi_{FitError}=\text{range}(\{\varepsilon_i:\forall i\})=\max(\{\varepsilon_i:\forall i\})-\min(\{\varepsilon_i:\forall i\})$$

wherein:

$$\varepsilon_i=\text{pressure}(i)-\hat{m}i-\hat{b}$$

The residual range, $\varphi_{FitError}$, represents how poorly the model fits the observed pressure curve. A large range provides a strong indication that a partial aspiration occurred. Conversely, a small range indicates a full aspiration occurred.

In one embodiment, the slope and intercept measurements may be carried out by the HOST software to compute the test statistics that are directly proportional to the fluid's viscosity and density by using:

$$\varphi_{Density} = \hat{m}$$

$$\varphi_{viscosity} = C_{StaticAfterAspiration} - \hat{b} - \hat{m}T$$

wherein:
$\hat{m}$=Estimated slope of best fit line
$\hat{b}$=Estimated y intercept of best fit line
$C_{StaticAfterAspiration}$=Static Pressure counts after the aspiration
T=Length of the best fitline in time Referring now to FIG. 23, a graphical representation of viscosity calculation is shown. In some embodiments, a minimum, maximum, average, and standard deviation of slew data points may be calculated. Once these values are calculated, linear regression may then be used to fit a line and calculate the slope, intercept and residual error. In some embodiments, the viscosity metric may be calculated by subtracting a determined last point of the slew region from a final point in the curve. This allows for the determination of the delta between the starting and ending viscosity. This viscosity metric (e.g., clog delta, the residual pressure, or trapped pressure) can then be used for various calculations as discussed herein.

Figure 23:
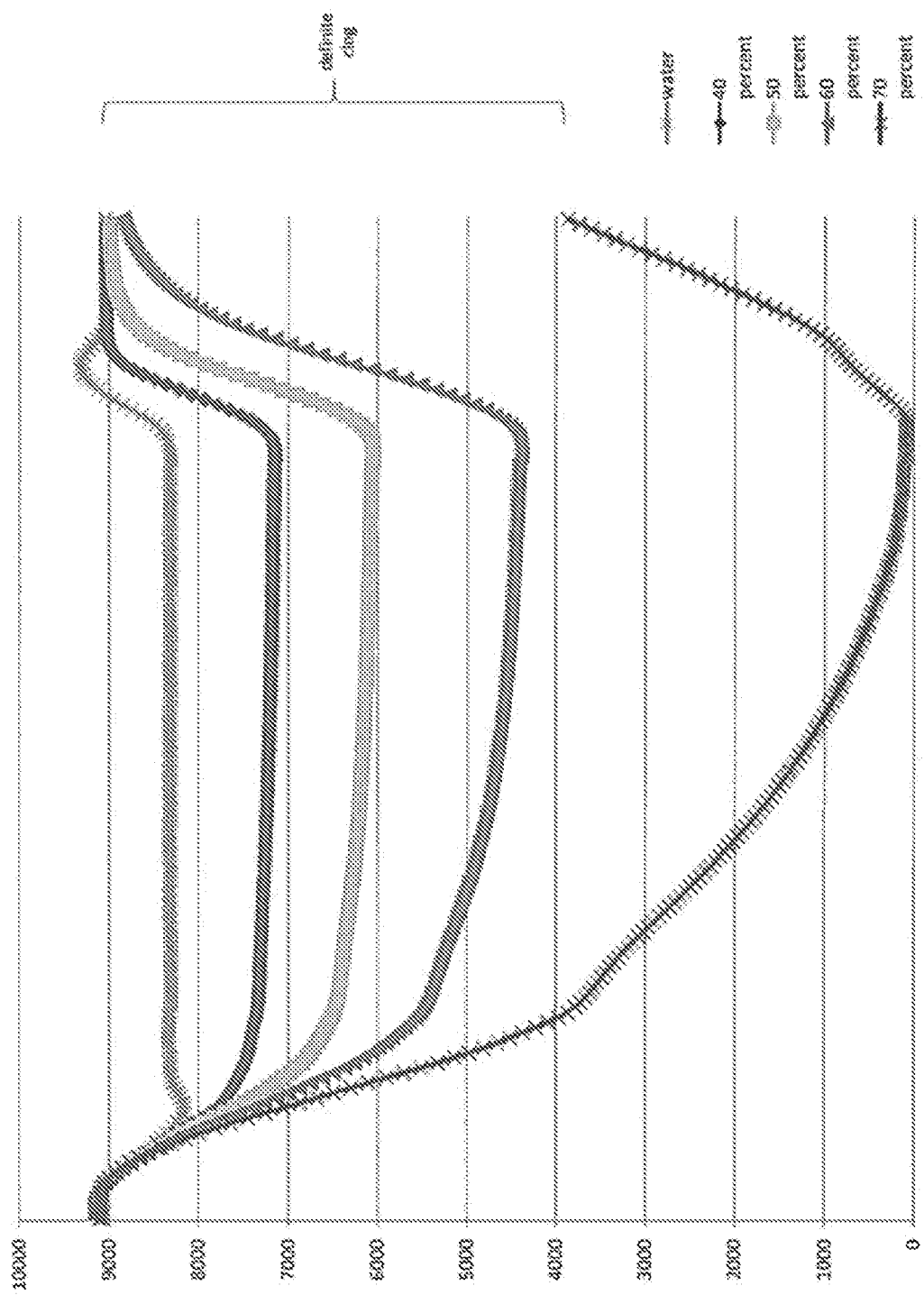
FIG. 23 is a graphical example of the pressure detected for various mixture levels.

It should be understood that in some embodiments, the viscosity metric is a measure of the static pressures before and after a successful aspiration. Generally, the viscosly should be roughly the same at the beginning and end of an aspiration process. If the pressure after the aspiration is significantly lower, that likely indicates a full or partial probe clog has occurred and trapped pressure (e.g., created a negative pressure chamber or vacuum). Thus, in an embodiment, the final point in the curve may be subtracted from the median of the first few pressure points. As shown in FIG. 23, the pressure starts at around 9000 for each fluid. However, by the end of the process, it is clear that the 70 percent mixture has a much lower pressure. This change in pressure (i.e., delta) is shown via the bracket identified as "definite clog." It is clear that the pressure being approximately half the original level is an indicator of a clog during the aspiration process.

Figure 24:
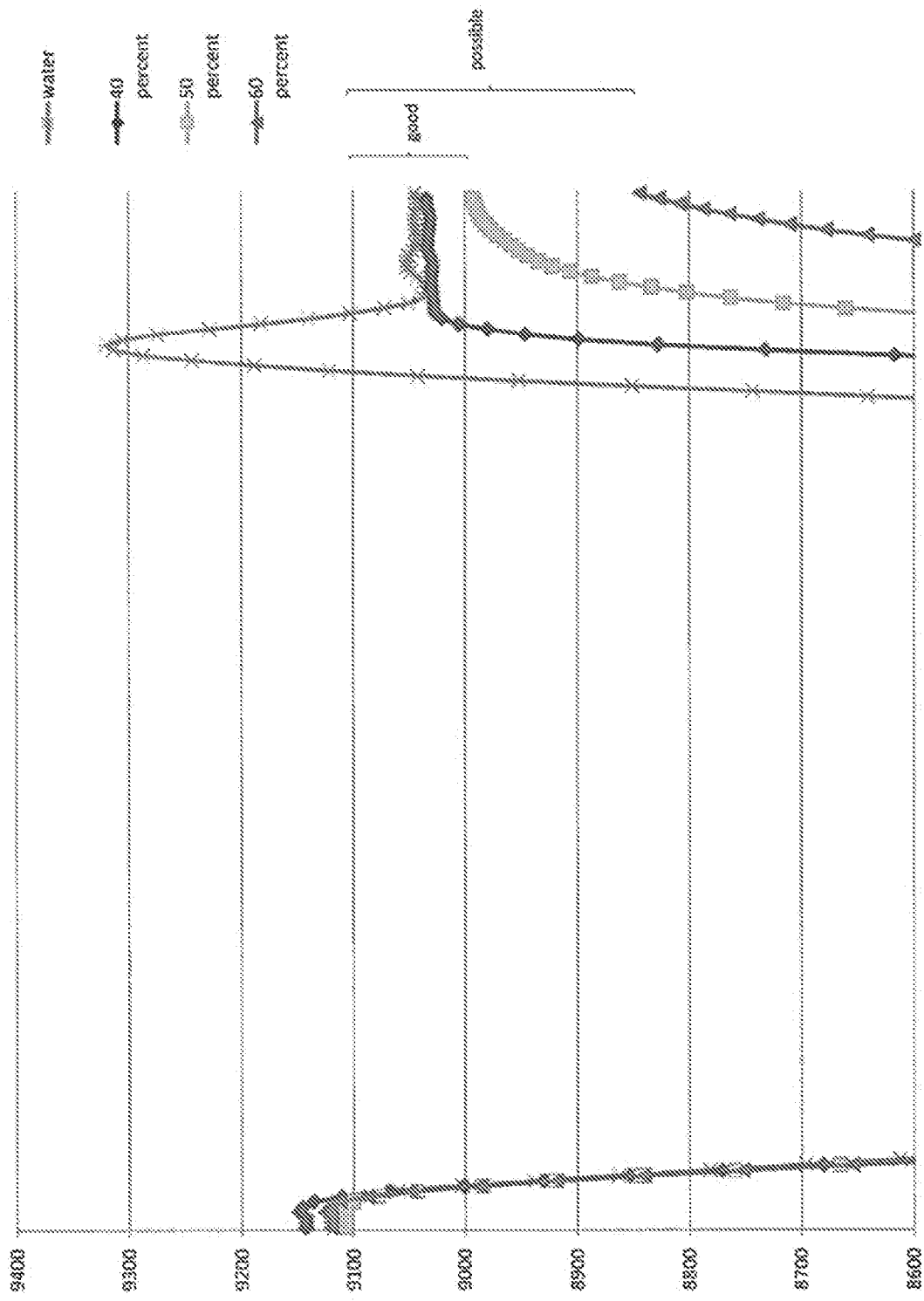
FIG. 24 is another graphical example of the pressure detected for various mixture levels.

Referring now to FIG. 24, which is a zoomed in version of the data in FIG. 23, it shows that the water, 40 percent, and 50 percent fluids returned to close to the original pressure value. However, the 60 percent fluid has a delta of 250, which could indicate a possible clog. FIGS. 23 and 24 shows aspirations of five solutions of increasing viscosity. In the illustrated embodiment, the aspiration volumes were the same and were performed using the same pump speed and hardware.

Once the three test statistics (e.g., $\varphi_{FitError}$, $\varphi_{Density}$, and $\varphi_{viscosity}$) are computed, an embodiment may compare them to a set of calibrated thresholds, $\tau_{MinDensity}$, $\tau_{MaxDensity}$, $\tau_{MinViscosity}$, $\tau_{MaxViscosity}$, and $\tau_{MaxError}$, to determine if the aspiration was successful. Additional details regarding how these values are set can be found herein. In one embodiment, aspiration is deemed successful if, and only if, all of the test statistics fall within the following range.

$$\tau_{MinDensity} \leq \varphi_{Density} \leq \tau_{MaxDensity}$$

$$\tau_{MinViscosity} \leq \varphi_{viscosity} \leq \tau_{MaxViscosity}$$

$$\varphi_{FitError} \leq \tau_{MaxError}$$

Thus, in one embodiment, if all conditions above are true, then the aspiration is deemed successful. If any one of the above conditions fails, then the aspiration is deemed unsuccessful. In a further embodiment, to determine if an unsuccessful aspiration was a clog, any one of the following conditions must be true:

$$\tau_{MaxViscosity} \leq \varphi_{viscosity}$$

$$\varphi_{Density} \leq \tau_{MinDensity}$$

$$\hat{b} \leq 1000$$

Figure 25:
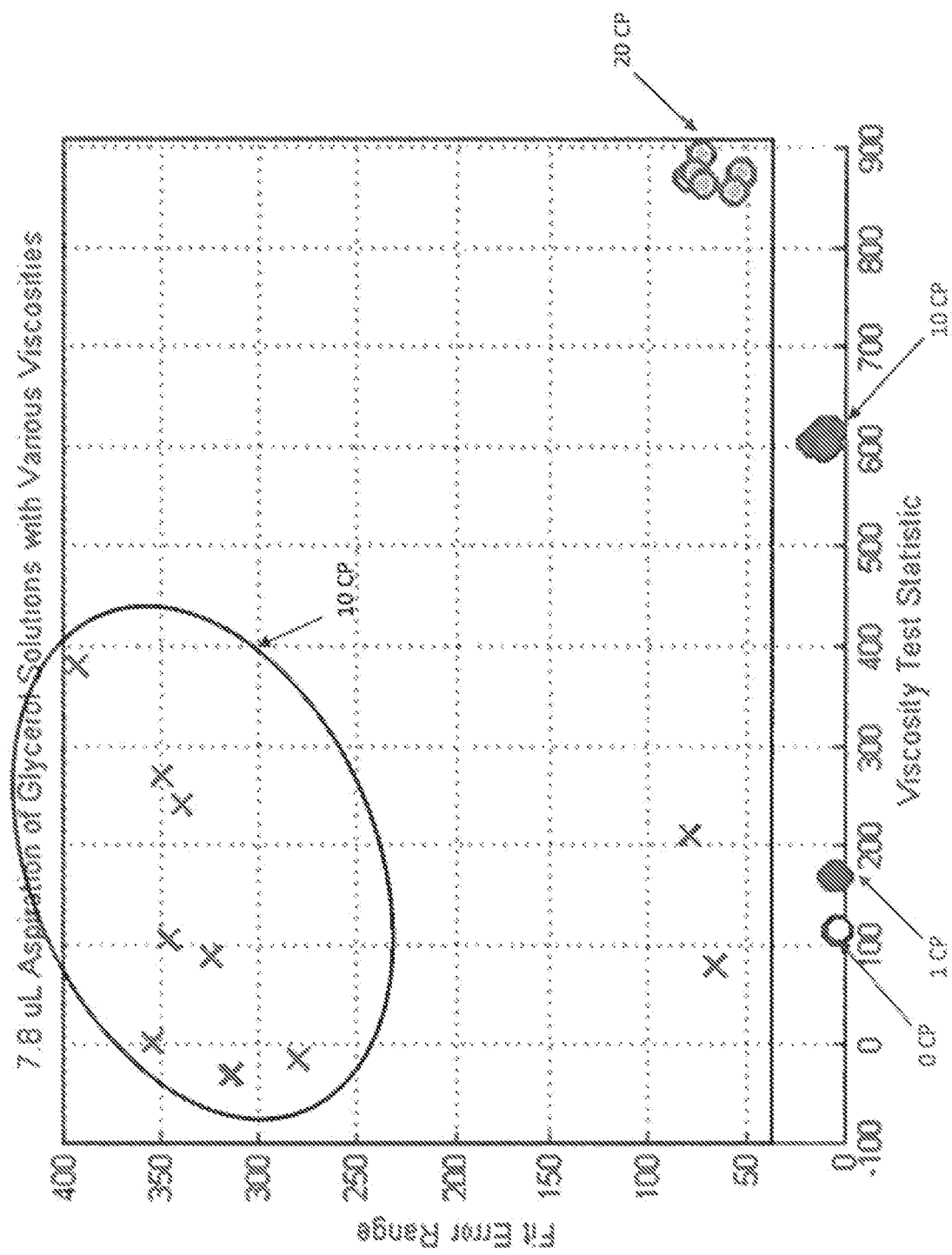
FIG. 25 is a graphical example of multiple test statistics sets for various solutions with different viscosities.
Figure 26:
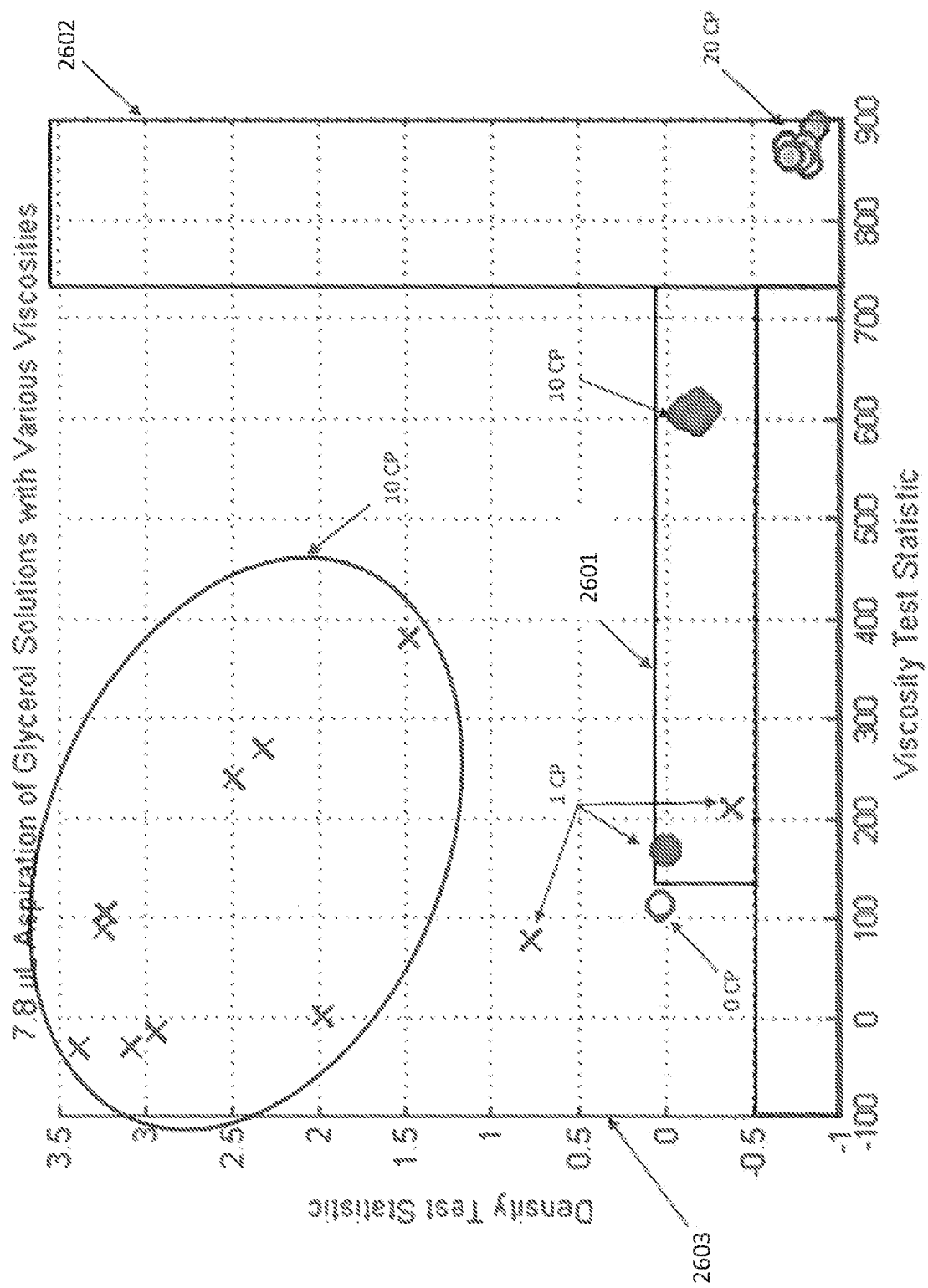
FIG. 26 is a graphical example of viscosity vs. density statistics.
Figure 27:
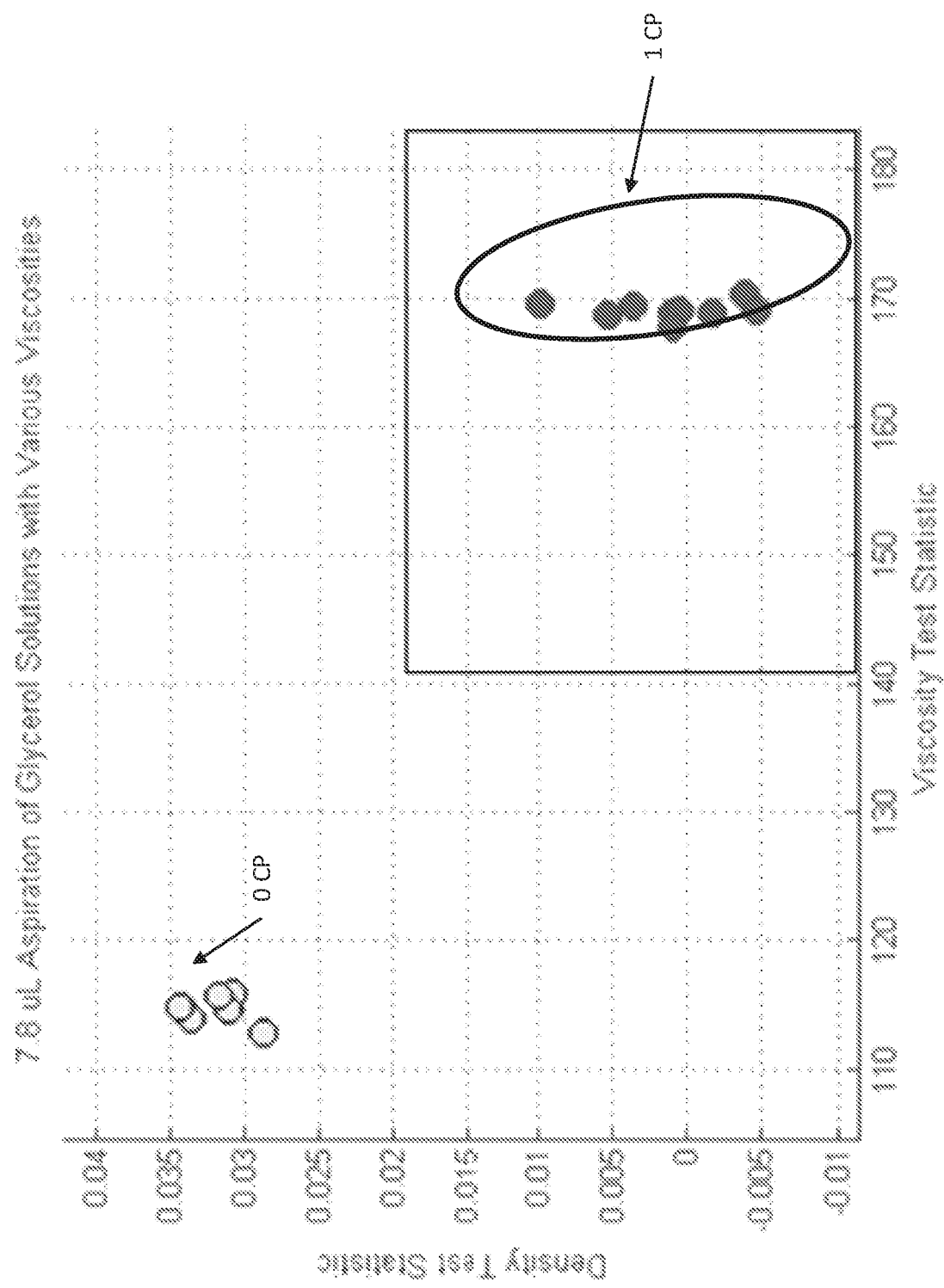
FIG. 27 is another graphical example of viscosity vs. density statistics.
Figure 28:
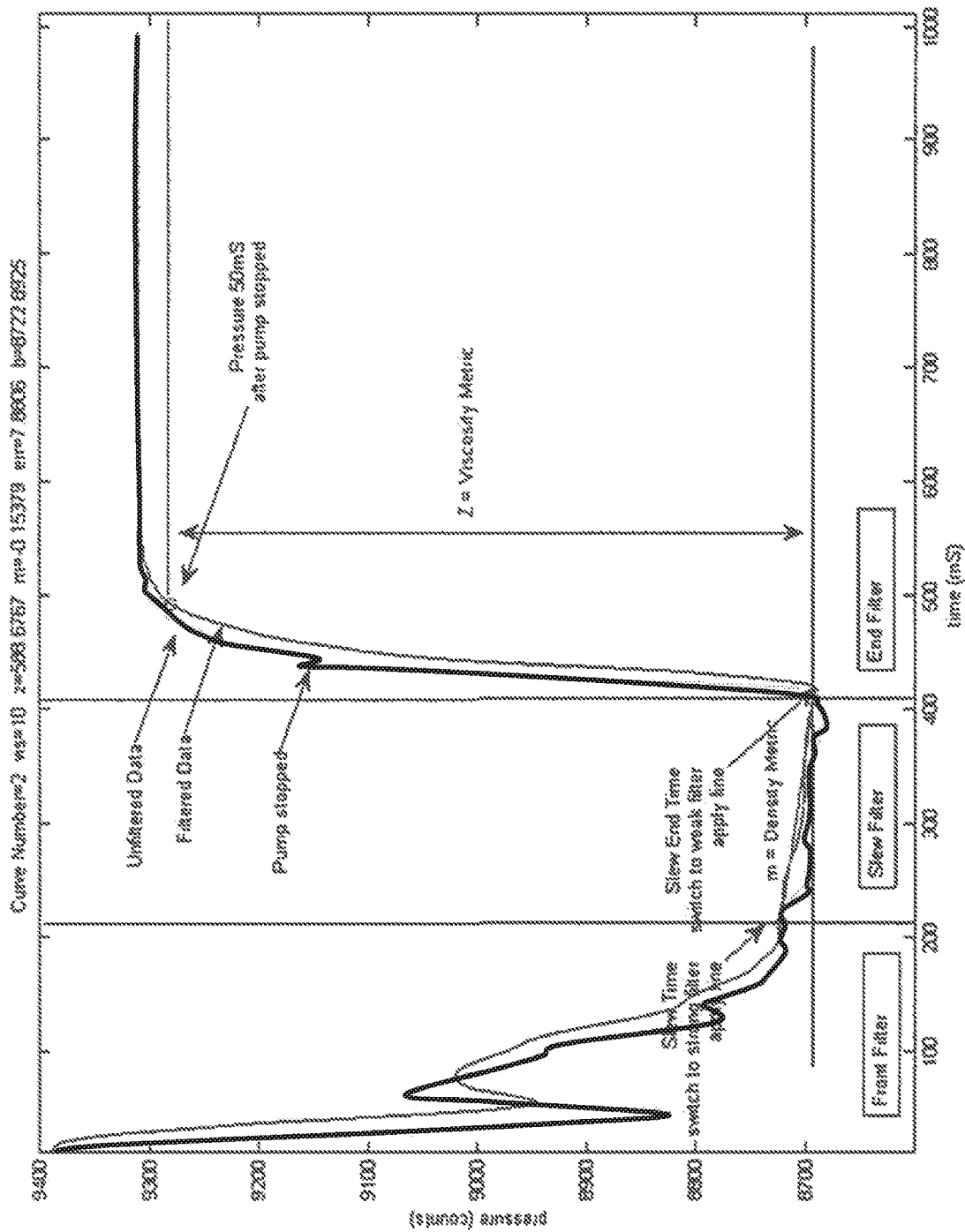
FIG. 28 is a graphical example of pressure vs. time.

In another embodiment, if none of the above conditions are satisfied, then the aspiration is deemed to be a short. FIGS. 25-27 provide a visual representation of applying the error logic to real data from aspirating 7.8 µL fluid at very slow speed. The FIGS. contain a series of coded dots and x's that represent test statistic results from numerous aspirations. The dots correspond to results from full aspirations of fluids with viscosities 0, 1, 10, and 20 cp, as labeled. The x's correspond to partial (short) aspirations using the same color code for viscosity. For example, an x represents results from a partial aspiration of a fluid with viscosity as labeled.

Using the test statistics, an embodiment first checks if the aspiration was successful. It first checks if the model fits the pressure data well by ensuring the fit error, $\varphi_{FitError}$, is below a pre-determined value. FIG. 25 displays the viscosity test statistic vs. the fit error. The shaded region represents the domain where the fit error is above the threshold. Any dot or x that falls in this region will already be deemed an unsuccessful aspiration by one embodiment. At this point, this aspiration could be either a clog or a partial aspiration. Any dot or x that falls within the white region is deemed to be full aspiration of something with the potential of being successful. At this point, an embodiment may not be sure if the something is air, fluid, or a full clog.

Inspection of FIG. 25 shows that all x's fall in the shaded region. This indicates that an embodiment has successfully classified all true partial aspirations as unsuccessful. Also, note that the 0, 1, and 10 CP dots fall within the white region. This shows that an embodiment has successfully classified all full air, full 1 cp, and full 10 cp aspirations as full aspirations and, thus, they have the potential of being successful. An embodiment may initially deem the 20 cp dots, representing full aspirations of a clog at 20 cp, as a partial aspiration, and will be ruled out from being successful. However, as discussed herein, an embodiment will later determine that these results have a viscosity and density that are too high, and will be classified as a clog (e.g., partial or full).

Once an embodiment determines if a full or partial aspiration has occurred, it then checks to see if the viscosity and density test statistics fall within the expected range. FIG. 26 displays the viscosity vs. the density test statistics. The shaded regions represent the domain of successful aspirations 2601, clogs 2602, or air/shorts 2603.

FIG. 26 provides a zoomed in view between the air and water results to provide visual clarity. By inspecting FIGS. 26 and 27, it is clear that an embodiment deems all 1 cp and 10 cp dots as successful aspirations. The 1 cp dots, corresponding to air, fall inside the short region, and would be successfully identified as a short. The 20 cp dots, fall in the clog region, and would be classified as such. The majority of the x's fall into the air/short region, and are deemed a partial aspiration. Note that one 1 cp x falls inside the successful region. However, recall that this point has already been ruled out since it failed to pass the fit error test, as shown in FIG. 25, because it does not fall within the clog region, it is classified as a partial short.

Anytime hardware is replaced, including the probe, the sensing electronics, tubing, or any part within the transfer arm, a system calibration is required. All of these components affect the overall gain and offset applied to the pressure data being processed by the algorithm. Hence, the thresholds being used to classify aspirations must reflect the changes made to the pressure data. Thus, in one embodiment, a periodic calibration should be performed to account for long term drift.

Calibration requires an embodiment to run the algorithm on an air and water baseline. The air and water baselines are performed first by positioning the probe in a drain station. For the air baseline, the fountain is turned off and then the probe aspirates the maximum amount of air, for each pump speed, while applying the algorithm. This process is repeated with the fountain turned on for the water baseline. This generates the viscosity, density, and fit error test statistics for both air and water. Once gathered, the software uses the test statistics with the following equations to set the thresholds limits:

$$\tau_{MinDensity} = \tfrac{1}{2}\varphi_{Density\ Air\ Baseline}$$

$$\tau_{MaxDensity} = \beta_{Density}$$

$$\tau_{MinViscosity} = \tfrac{1}{2}\varphi_{Viscosity\ Water\ Baseline} + \tfrac{1}{2}\varphi_{Viscosity\ Air\ Baseline}$$

$$\tau_{MaxViscosity} = (\varphi_{Viscosity\ Water\ Baseline} - \varphi_{Viscosity\ Air\ Baseline})\beta_{Viscosity}$$

|  | Very Slow | Slow | Med | Fast |
|---|---|---|---|---|
| $\beta_{Density}$ | −0.6 | −1.5 | −2.5 | −5.0 |
| $\beta_{Viscosity}$ | 12.8 | 13.5 | 12.1 | 11.14 |

$$\tau_{MinDensity} = \alpha\varphi_{Density\ Air\ Baseline}$$

$$\tau_{MaxDensity} = \varphi_{Density\ Air\ Baseline}\left[(1-b)\frac{\rho_{10CP}-\rho_{1CP}}{\rho_{0CP}-\rho_{1CP}} + b\frac{\rho_{20CP}-\rho_{1CP}}{\rho_{0CP}-\rho_{1CP}}\right]$$

$$\tau_{MinViscosity} = (1-c)\varphi_{Viscosity\ Water\ Baseline} + c\varphi_{Viscosity\ Air\ Baseline}$$

$$\tau_{MaxViscosity} = (\varphi_{Viscosity\ Water\ Baseline} - \varphi_{Viscosity\ Air\ Baseline})\left[(1-d)\frac{10cp}{1cp} + d\beta\frac{20cp}{1cp}\right]$$

Density Metric calculations were found to vary, depending on the vertical height of the probe relative to the measuring apparatus. A further refinement to the calculation was discovered that effectively removes any probe vertical height dependency.

This new quantity is called the Viscosity Metric. It is calculated by subtracting a pressure reading taken after the pump motion stops and the system has recovered to static conditions from a reading taken at the end of the slew phase of the pump motion. This metric has been found to be very useful in identifying both short aspirations and partial or full probe obstructions or clogs.

Regarding system gain effects, setting error limits for calculated Viscosity Metric values is made more difficult by gain differences between systems, even when the hardware, electronics, and software of those systems are nominally identical. It is possible to perform the above calculations to determine the Viscosity Metric while aspirating air. Air aspirations performed by each probe using one or more sets of pump parameters can be used to effectively baseline system gain.

An "air baseline" Viscosity Metric can be subtracted from the Viscosity Metric calculated following a fluid aspiration performed by the same apparatus and using identical pump parameters. It was discovered that the resulting meta value effectively normalizes the metric and cancels out any system gain effects.

Temperature effects and temperature gradients, which can change fluid viscosity, must be accounted for. Thus, an embodiment may see slight trending in reagent pressure curves as the probe tracks down through a well. Further detail regarding temperature effects can be seen at FIGS. 29-31.

As discussed herein, various embodiments exist for detecting aspiration in a clinical analyzer. Accordingly, a further embodiment may, based on the ability disclosed herein, determine if a short aspiration was completed properly (e.g., not clogged or short). Once an embodiment can determine which aspirations finished properly, the data from those aspirations can be recorded or analyzed in a clinical assay. It should be understood that the clinical analysis may be for any analyte. Thus, various procedures and test hypothesis can be more accurately verified using the techniques and tools described herein. Thus, an embodiment is a technical improvement over the current state of the art in that it combines various sensors, monitoring tools, environment characteristics, and known variables to most accurately identify faulty or inaccurate tests that have been carried out. This allows for better and more accurate clinical analysis to be carried out via specialized research equipment.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A method for detecting aspiration in a clinical analyzer, comprising:
   providing an aspiration system that produces unwanted system noise represented by unwanted data points, the aspiration system comprising:
   a pump,
   a probe,
   a fluid vessel,
   a fluid within the fluid vessel,
   a tubing, wherein the pump and the probe are attached to the tubing,
   a pressure sensor attached to the tubing and configured to sense pressures of the pump during an aspiration process on the fluid, wherein a pressure measurement data comprises the sensed pressures of the pump during the aspiration process;
   performing, by the aspiration system, the aspiration process on the fluid;

sensing, by the pressure sensor during the aspiration process, the pressure measurement data, wherein the pressure measurement data is in a time domain;

acquiring, from the pressure sensor, the pressure measurement data;

transforming the pressure measurement data into a first version of frequency domain data by transforming the pressure measurement data from the time domain to a frequency domain, wherein the frequency domain data comprises the unwanted data points, wherein each of the unwanted data points has a frequency value;

generating a second version of the frequency domain data by attenuating, using a filter, the unwanted data points having a respective frequency value greater than a frequency cutoff value;

providing a predetermined dataset representative of the aspiration process performed by a calibrated aspiration system;

comparing the second version of the frequency domain data to the predetermined dataset; and determining, based on the comparison of the second version of the frequency domain data to the predetermined dataset, a quality of the performed aspiration.

2. The method of claim 1, further comprising adjusting the frequency cutoff value for the filter using a digital signal processor.

3. The method of claim 2, wherein the filter is a Butterworth low-pass filter.

4. The method of claim 2, wherein the filter comprises filter coefficients, wherein at least one of the filter coefficients is determined using at least one of: the frequency cutoff value and sampling rate of the pressure data, wherein the at least one of the filter coefficients is determined to minimize a number of unwanted data points.

5. The method of claim 2, wherein the frequency cutoff value is determined using pump characteristics, comprising at least one of: acceleration, slew, and deceleration, wherein the frequency cutoff value is determined to minimize a number of unwanted data points.

6. The method of claim 1, wherein said comparing the second version of the frequency domain data to the predetermined dataset further comprises:

transforming the second version of the frequency domain data into time domain data; and comparing the time domain data to one or more predetermined data points.

7. The method of claim 1, wherein said comparing further comprises:

comparing one or more pressure measurements at an end of the aspiration process with a previously established aspiration pressure baseline, wherein the previously established aspiration pressure baseline comprises a range of pressure values during the aspiration process performed by the calibrated aspiration system.

8. The method of claim 1, further comprising:

generating, based on the second version of the frequency domain data, a pressure curve; and evaluating, by applying a second derivative algorithm to the second version of the frequency domain data, a shape of the pressure curve.

9. The method of claim 1, further comprising:

determining, using the pressure measurement data, one or more system characteristics comprising:

at least one probe diameter of the probe, at least one aspiration rate of the aspiration process, at least one aspiration duration of the aspiration process, at least one viscosity level of the fluid, and modifying the one or more system characteristics to reduce the unwanted system noise.

10. The method of claim 1, wherein the aspiration is performed on 5 μL of fluid or less.

11. An information handling device for detecting aspiration in a clinical analyzer, comprising:

an aspiration system that produces unwanted system noise represented by unwanted data points, the aspiration system comprising:

a pump, a probe, a fluid vessel, a fluid within the fluid vessel, a tubing, wherein the pump and the probe are attached to the tubing, a pressure sensor attached to the tubing and configured to sense pressures of the pump during an aspiration process on the fluid, wherein a pressure measurement data comprises the sensed pressures of the pump during the aspiration process;

a processor; and a memory device that stores instructions executable by the processor to:

cause the aspiration system to perform the aspiration process on the fluid, acquire, from the pressure sensor, the pressure measurement data, transform the pressure measurement data into a first version frequency domain data by transforming the pressure measurement data from a time domain to a frequency domain, wherein the frequency domain data comprises the unwanted data points, wherein each of the unwanted data points has a frequency value, generate a second version of the frequency domain data by attenuating, using a filter, the unwanted points having a respective frequency value greater than a frequency cutoff value, providing a predetermined dataset representative of the aspiration process performed by a calibrated aspiration system;

compare the second version of the frequency domain data to the predetermined dataset, and determine, based on the comparison of the second version of the frequency domain data to the predetermined dataset, a quality of the performed aspiration.

12. The information handling device of claim 11, wherein the instructions are further executable by the processor to: adjust the frequency cutoff value for the filter using a digital signal processor.

13. The information handling device of claim 12, wherein the filter is a Butterworth low-pass filter.

14. The information handling device of claim 12, wherein the filter comprises filter coefficients, wherein at least one of the filter coefficients is determined using at least one of: the frequency cutoff value and sampling rate of the pressure data, wherein the at least one of the filter coefficients is determined to minimize a number of unwanted data points.

15. The information handling device of claim 12, wherein the frequency cutoff value is determined using pump characteristics, comprising at least one of: acceleration, slew, and deceleration, wherein the frequency cutoff value is determined to minimize a number of unwanted data points.

16. The information handling device of claim 11, wherein said comparison of the second version of the frequency domain data to the predetermined dataset further comprises:

transforming the second version of the frequency domain data into time domain data, comparing the time domain data to one or more predetermined data points.

17. The information handling device of claim 11, wherein said comparison of the second version of the frequency domain data to the predetermined dataset further comprises:

comparing one or more pressure measurements at an end of the aspiration process with a previously established aspiration pressure baseline, wherein the previously established aspiration pressure baseline comprises a range of pressure values during the aspiration process performed by the calibrated aspiration system.

18. The information handling device of claim 11, wherein the instructions are further executable by the processor to:

generate, based on the second version of the frequency domain data, a pressure curve, and evaluate, by applying a second derivative algorithm to the second version of the frequency domain data, a shape of the pressure curve.

19. The information handling device of claim 11, wherein the instructions are further executable by the processor to:

determine, using the pressure measurement data, one or more system characteristics comprising:

at least one probe diameter of the probe, at least one aspiration rate of the aspiration process, at least one aspiration duration of the aspiration process, at least one viscosity level of the fluid, and modify the one or more system characteristics to reduce the unwanted system noise.

* * * * *